United States Patent
Shiraishi et al.

(10) Patent No.: US 10,728,418 B2
(45) Date of Patent: Jul. 28, 2020

(54) REMOTE CONTROL SYSTEM METHOD, AND PROGRAM FOR IMAGE PROCESSING APPARATUS

(71) Applicant: Konica Minolta, Inc., Tokyo (JP)

(72) Inventors: Jun Shiraishi, Toyokawa (JP); Hiroyuki Ohno, Toyokawa (JP); Mie Kawabata, Toyokawa (JP); Hideyuki Matsuda, Hirakata (JP); Yoichi Kurumasa, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 5 days.

(21) Appl. No.: 15/266,255

(22) Filed: Sep. 15, 2016

(65) Prior Publication Data
US 2017/0085745 A1 Mar. 23, 2017

(30) Foreign Application Priority Data
Sep. 17, 2015 (JP) .................. 2015-183968

(51) Int. Cl.
H04N 1/00 (2006.01)
H04N 1/327 (2006.01)

(52) U.S. Cl.
CPC ..... H04N 1/32776 (2013.01); H04N 1/00307 (2013.01); H04N 1/32793 (2013.01); H04N 2201/0017 (2013.01); H04N 2201/0075 (2013.01); H04N 2201/0094 (2013.01)

(58) Field of Classification Search
None
See application file for complete search history.

(56) References Cited

U.S. PATENT DOCUMENTS

2013/0111238 A1* 5/2013 Takahashi .......... H04N 1/00222
   713/320
2014/0293339 A1* 10/2014 Satou ................. H04N 1/00488
   358/1.15

FOREIGN PATENT DOCUMENTS

| CN | 103853324 A | 6/2014 |
| CN | 104079746 A | 10/2014 |
| CN | 104702587 A | 6/2015 |

(Continued)

OTHER PUBLICATIONS

China Patent Application No. 20161089542.0; Office Action; dated Jun. 4, 2018; 10 pages.

(Continued)

Primary Examiner — Mohammad H Ghayour
Assistant Examiner — Pawan Dhingra
(74) Attorney, Agent, or Firm — BakerHostetler

(57) ABSTRACT

An image processing apparatus capable of being remotely operated by a remote operation device includes an operation acceptor, and a hardware processor, wherein the hardware processor executes a process corresponding to the operation accepted by the operation acceptor, in the case where a cooperation mode is set, executes a process in accordance with a command received from the remote operation device, acquires a type of a first medium used by the remote operation device, in the case where the cooperation mode is not set, notifies the user by using a second medium when an operation is accepted by the operation acceptor, and in the case where the cooperation mode is set, if the second medium is different from the first medium, notifies the user by using the first medium when an operation is accepted by the operation acceptor.

16 Claims, 14 Drawing Sheets

(56) References Cited

FOREIGN PATENT DOCUMENTS

| | | |
|---|---|---|
| CN | 104717386 A | 6/2015 |
| JP | H05122424 A | 5/1993 |

OTHER PUBLICATIONS

China Patent Application No. 201610819542.0; Office Action; dated Jan. 21, 2019; 13 pages.
China Patent Application No. 201610819542.0; Third Office Action; dated Jul. 12, 2019; Jul. 12, 2019; 16 pages.

* cited by examiner

REMOTE CONTROL SYSTEM METHOD, AND PROGRAM FOR IMAGE PROCESSING APPARATUS

CROSS REFERENCE TO RELATED APPLICATIONS

This application is entitled to and claims the benefit of Japanese Patent Application No. 2015-183968 filed with Japan Patent Office on Sep. 17, 2015, the entire contents of which is hereby incorporated by reference.

BACKGROUND OF THE INVENTION

Field of the Invention

The present invention relates to a remote control system, an image processing apparatus, a remote control method, and a non-transitory computer-readable recording medium encoded with a remote control program. More specifically, the present invention relates to a remote control system capable of remotely operating an image processing apparatus, the image processing apparatus, a remote control method performed by the image processing apparatus, and a non-transitory computer-readable recording medium encoded with a remote operation program.

Description of the Related Art

In recent years, technologies for remotely operating Multi Function Peripherals (hereinafter referred to as MFPs) with portable information devices such as smart phones and tablet terminals are known. A portable information device can be connected to an MFP and remotely operate the MFP. As the technology that realizes this remote operation, a technology for remotely controlling the MFP from the portable information device by display of an operation screen displayed in the MFP in the portable information device and return of position information indicating a position designated by a user in the operation screen to the MFP by the portable information device is known.

For example, in Japanese Patent Laid-Open No. H05-122424, a remote control device for an office appliance including an office appliance having a display unit and an input unit, a remote control unit having a display unit and an input unit, and an information transmission path that connects at least the one office appliance to the remote control unit, characterized in that the remote control device for the office appliance includes first image storage means for storing display information indicating a state of the office appliance and a position of input means as two-dimensional image information, first bitmap display means for displaying the two-dimensional image information stored by the first image storage means, and first control means for changing an operation mode of the office appliance in response to an input indicating a predetermined position on a display of the bitmap display means and a remote control command received from the information transmission path, and outputting the two-dimensional image information stored in the first image storage means in response to a predetermined instruction, in the office appliance, and the remote control device for the office appliance includes second image storage means for inputting and storing the two-dimensional image information that appears in the information transmission path, second bitmap display means for displaying the two-dimensional image information stored by the second image storage means, and second control means for outputting a predetermined remote control command to the information transmission path in response to an input indicating a position on a display of the second bitmap display means, in the remote control unit, is described.

In the case where the technology for remotely controlling the office appliance equivalent to the MFP from a remote control unit equivalent to the portable information device described in Japanese Patent Laid-Open No. 05-122424 is used, because an operation performed for the portable information device is the same as an operation performed for the MFP, it is possible to remotely operate the office appliance by using the portable information device by the operation that is same as the case where the MFP is directly operated. However, in the case where there is a difference between a user interface of the portable information device and a user interface of the MFP, there sometimes is a function that can be realized in one of the portable information device and the MFP but cannot be realized in the other. For example, the portable information device has a vibration device that generates vibration, and has a user interface that notifies a user of acceptance of an operation by vibration in response to the acceptance of the operation by driving the vibration device. However, in the case where the MFP does not have a vibration device, the MFP cannot notify the user of acceptance of an operation by vibration. Further, there sometimes is the case where degrees for realization of a function are different between the portable information device and the MFP although the user interface of the portable information device and the user interface of the MFP are the same. For example, in the case where the portable information device and the MFP have speakers that generate sound, and have user interfaces that notify the user of acceptance of an operation by the sound generated from the speakers in response to the acceptance of the operation, the volume of the sound generated by the portable information device and the volume of the sound generated by the MFP are sometimes different from each other. Therefore, because responses to the operation are different between the case where the user remotely operates the MFP by the portable information device, and the case where the user operates the MFP, there is a problem that the difference between responses to the same operation gives the user an uncomfortable feeling.

SUMMARY OF THE INVENTION

According to one aspect of the present invention, a remote control system that includes an image processing apparatus and a remote operation device capable of remotely operating the image processing apparatus, wherein the remote operation device includes a remote-side acceptor that accepts an operation by a user, and a hardware processor, the hardware processor included in the remote operation device, when the operation is accepted by the remote-side acceptor, transmits a remote operation command to the image processing apparatus, the image processing apparatus includes a device-side acceptor that accepts an operation by the user, and a hardware processor, the hardware processor included in the image processing apparatus executes a process corresponding to the operation accepted by the device-side acceptor, and in an cooperation mode where a communication path is established with the remote operation device, executes a process in accordance with the remote operation command received from the remote operation device, a hardware processor included in a first device that is any one of the remote operation device and the image processing apparatus notifies the user by using a first medium when an operation by the user is accepted, and a hardware processor included in a second device that is different from the first device of the remote operation device and the image processing apparatus, in the case where a cooperation mode where a communication path is established with the first device is not set, notifies the user by using a second medium when an operation by the user is accepted, and in the case where the cooperation mode is set, if the second medium is different from the first medium, and it is possible to notify the user by using the first medium, notifies the user by using the first medium when an operation by the user is accepted.

According to another aspect of the present invention, an image processing apparatus capable of being remotely operated by a remote operation device includes an operation acceptor that accepts an operation by a user, and a hardware processor, wherein the hardware processor executes a process corresponding to the operation accepted by the operation acceptor, in the case where a cooperation mode where a communication path is established with the remote operation device is set, executes a process in accordance with a remote operation command received from the remote operation device, acquires a type of a first medium used to notify the user when an operation is accepted by the remote operation device, in the case where the cooperation mode is not set, notifies the user by using a second medium when an operation is accepted by the operation acceptor, and in the case where the cooperation mode is set, if the second medium is different from the first medium, and it is possible to notify the user by using the first medium, notifies the user by using the first medium when an operation is accepted by the operation acceptor.

According to yet another aspect of the present invention, a remote control method performed by an image processing apparatus capable of being remotely operated by a remote operation device includes an acceptance step of accepting an operation by a user, a process execution step of executing a process corresponding to the operation accepted in the acceptance step, a setting step of setting the image processing apparatus in a cooperation mode where a communication path is established with the remote operation device, a remote control step of, in the cooperation mode, executing a process in accordance with a remote operation command received from the remote operation device, a type acquisition step of acquiring a type of a first medium used to notify the user when an operation is accepted by the remote operation device, a first notification step of, in the case where the cooperation mode is not set, notifying the user by using a second medium when the operation is accepted in the acceptance step, and a second notification step of, in the case where the cooperation mode is set, if the second medium is different from the first medium, and it is possible to notify the user by using the first medium, notifying the user by using the first medium when the operation is accepted in the acceptance step.

According to yet another aspect of the present invention, a non-transitory computer-readable recording medium encoded with a remote control program executed by a computer which controls an image processing apparatus capable of being remotely operated by a remote operation device, wherein the remote control program causes the computer to execute an acceptance step of accepting an operation by a user, a process execution step of executing a process corresponding to the operation accepted in the acceptance step, a setting step of setting the image processing apparatus in a cooperation mode where a communication path is established with the remote operation device, a remote control step of, in the cooperation mode, executing a process in accordance with a remote operation command received from the remote operation device, a type acquisition step of acquiring a type of a first medium used to notify the user when an operation is accepted by the remote operation device, a first notification step of, in the case where the cooperation mode is not set, notifying the user by using a second medium when the operation is accepted in the acceptance step; and a second notification step of, in the case where the cooperation mode is set, if the second medium is different from the first medium, and it is possible to notify the user by using the first medium, notifying the user by using the first medium when the operation is accepted in the acceptance step.

The foregoing and other features, aspects, and advantages of the present invention will become more apparent from the following detailed description of the present invention when taken in conjunction with the accompanying drawings.

DESCRIPTION OF THE PREFERRED EMBODIMENTS

Figure 1:
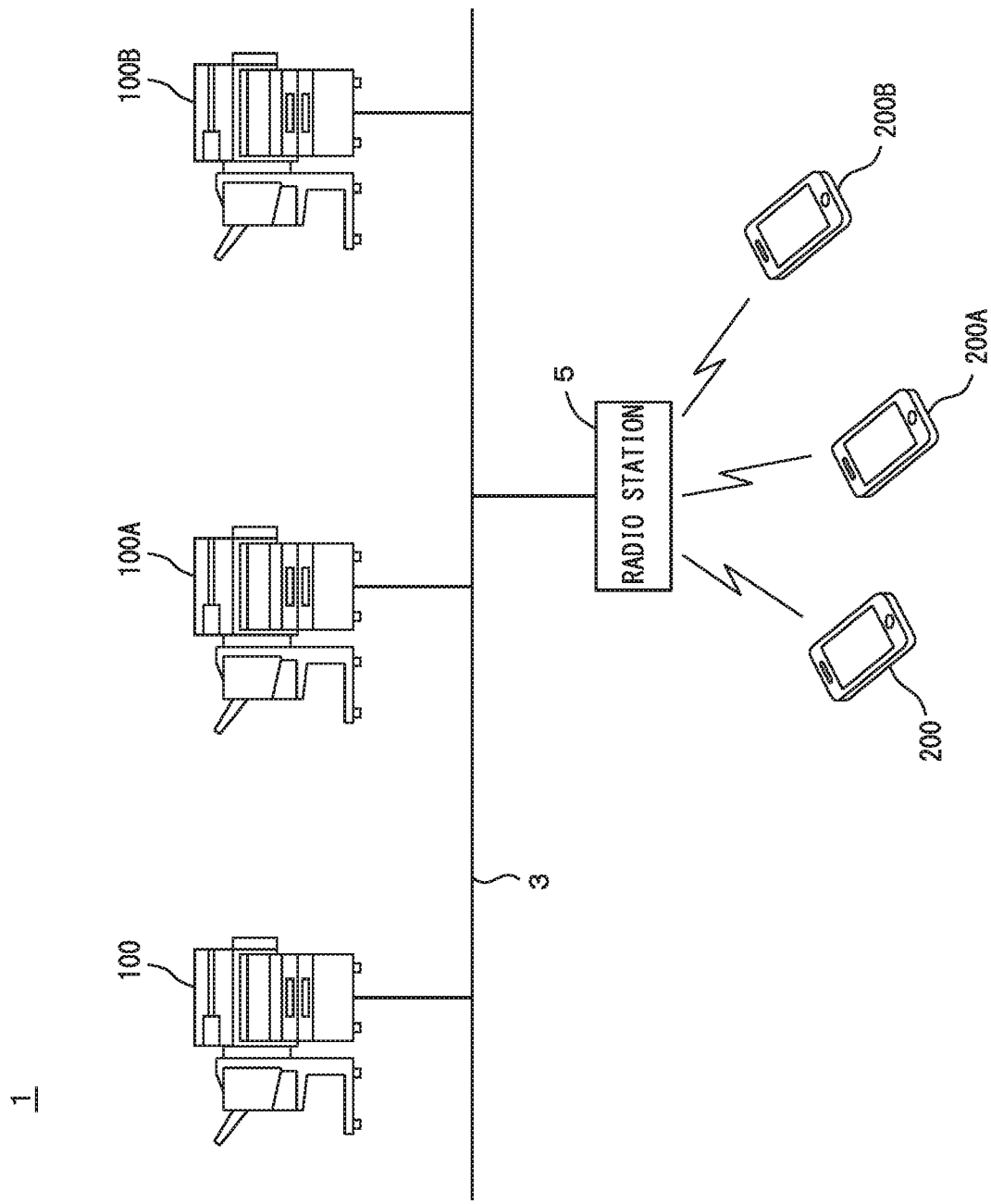
FIG. 1 is a diagram showing an overview of a remote control system in a first embodiment of the present invention.

Embodiments of the present invention will be described below with reference to drawings. In the following description, the same parts are denoted with the same reference characters. Their names and functions are also the same. Thus, a detailed description thereof will not be repeated.

First Embodiment

FIG. 1 is a diagram showing an overview of a remote control system in the first embodiment of the present invention. Referring to FIG. 1, the remote control system 1 includes each of MFPs (Multi Function Peripheral) 100, 100A, 100B that functions as an image processing apparatus, a radio station 5, and each of portable information devices 200, 200A, 200B that functions as a remote operation device capable of remotely controlling any of the MFPs 100, 100A, 100B. The MFPs 100, 100A, 100B, and the radio station 5 are connected to a network 3. The portable information devices 200, 200A, 200B are connected to the network 3 via the radio station 5.

The network 3 is a Local Area Network (LAN), either wired or wireless. Further, the network 3 is not limited to a LAN but may be a Wide Area Network (WAN), a Public Switched Telephone Network (PSTN), or the Internet.

The portable information devices 200, 200A, 200B are computers such as smart phones and PDAs (Personal Digital Assistants) carried and used by users. Each of the portable information devices 200, 200A, 200B has the same hardware configuration and functions. Thus, the portable information device 200 will be taken as an example in the description here, unless otherwise specified. Here, the portable information device 200 is a smart phone and has a wireless LAN function and a call function. Thus, the portable information device 200 thereby can connect to a mobile phone network to make a call by communicating with a mobile phone base station by radio.

In the remote control system 1 of the present embodiment, the portable information devices 200, 200A, 200B respectively and remotely operate the MFPs 100, 100A, 100B. In this case, each of the portable information devices 200, 200A, 200B functions as a remote operation device that remotely operates the MFPs 100, 100A, 100B, and each of the MFPs 100, 100A, 100B functions as a remote control device remotely operated by any of the portable information devices 200, 200A, 200B. A remote operation program for remotely operating the MFPs 100, 100A, 100B is installed in each of the portable information devices 200, 200A, 200B. The remote operation program is an application program common among the MFPs 100, 100A, 100B and compatible with any one of the MFPs 100, 100A, 100B. On the one hand, a remote control program that is remotely operated by the portable information device 200 and executes a process is installed in the MFP 100. The case where the portable information device 200 remotely operates the MFP 100 is described here as an example.

While the MFPs 100, 100A, 100B sometimes respectively have different configurations and executable functions from one another in the remote control system 1 of the present embodiment, the basic configuration is the same for all of the MFPs 100, 100A, 100B. The basic configuration of the MFP will be described here, and the MFP 100 will be described representatively.

Figure 2:
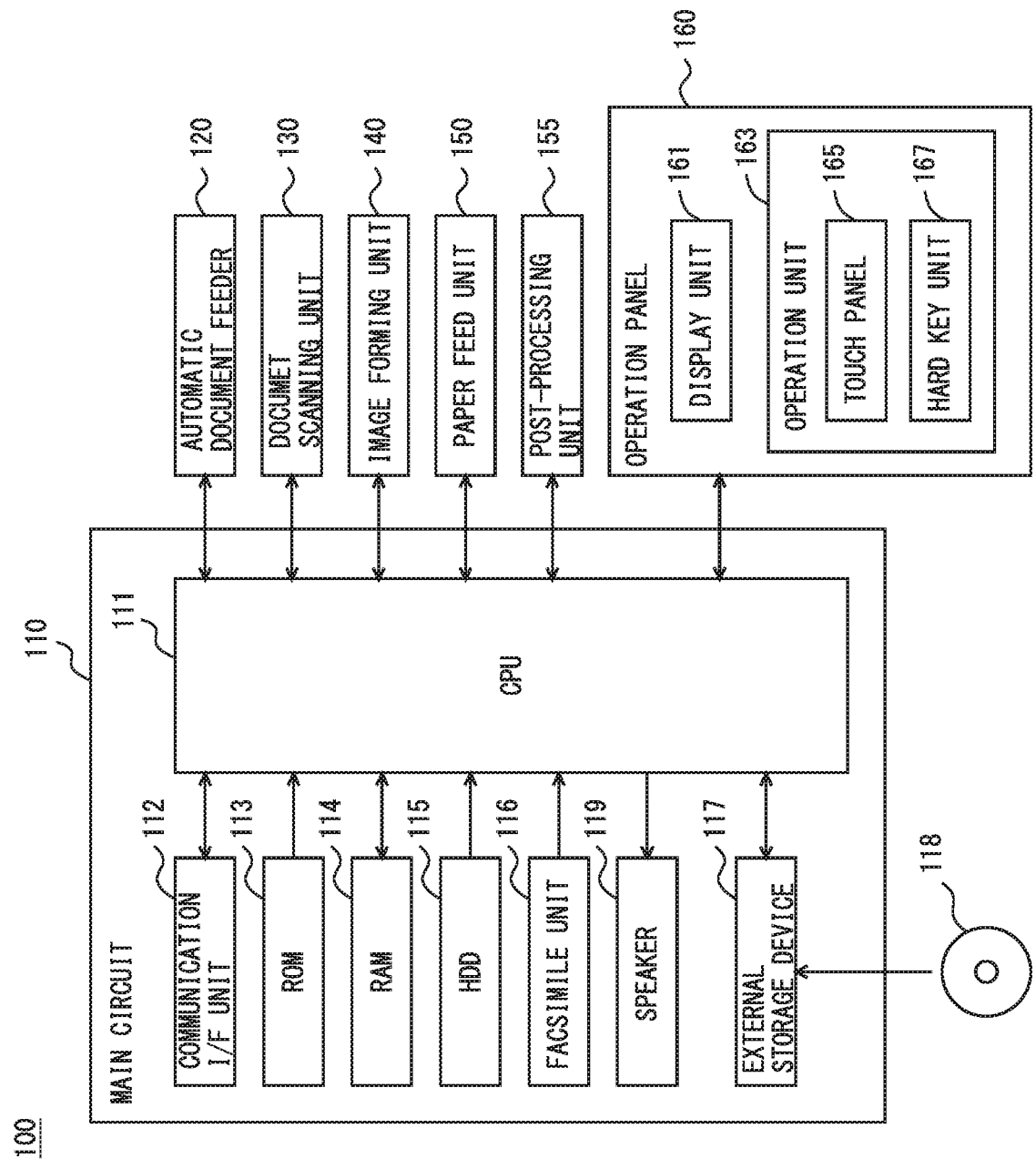
FIG. 2 is a block diagram showing an outline of a basic configuration of an MFP.

FIG. 2 is a block diagram showing the outline of the basic configuration of the MFP. Referring to FIG. 2, the MFP 100 includes a main circuit 110, a document scanning unit 130 for scanning a document, an automatic document feeder 120 for conveying a document to the document scanning unit 130, an image forming unit 140 for forming an image on a sheet of paper or other medium based on image data scanned and output by the document scanning unit 130, a paper feed unit 150 for supplying a sheet of paper to the image forming unit 140, a post-processing unit 155 for processing a sheet of paper on which an image is formed, and an operation panel 160 serving as a user interface.

The post-processing unit 155 performs a sorting process of sorting and discharging one or more sheets of paper on which images have been formed by image forming unit 140, a hole-punching process of punching the sheets, and a stapling process of stapling the sheets.

The main circuit 110 includes a CPU 111, a communication interface (I/F) unit 112, a ROM 113, a RAM 114, a hard disk drive (HDD) 115 as a mass storage, a facsimile unit 116, an external storage device 117 on which a compact disc ROM (CD-ROM) 118 is mounted, and a speaker 119. The CPU 111 is connected to the automatic document feeder 120, the document scanning unit 130, the image forming unit 140, the paper feed unit 150, the post-processing unit 155, and the operation panel 160 to control the entire MFP 100.

The ROM 113 stores a program executed by the CPU 111 or data necessary for execution of the program. The RAM 114 is used as a work area when the CPU 111 executes the program. Further, the RAM 114 includes a setting value storage region. The setting value storage region is a region for storing setting values for execution of the functions. Further, the RAM 114 temporarily stores scanned data (image data) continuously transmitted from the document scanning unit 130.

The communication I/F unit 112 is an interface for connecting the MFP 100 to the network 3. The CPU 111 communicates with the other MFPs 100A, 100B or the portable information devices 200, 200A, 200B via the communication I/F unit 112, and receives and transmits data. Further, the communication I/F unit 112 can communicate with a computer connected to the internet via the network 3.

The facsimile unit 116 is connected to public switched telephone networks (PSTN), and transmits facsimile data to or receives facsimile data from the PSTN. The facsimile unit 116 stores the received facsimile data in the HDD 115, or outputs the data to the image forming unit 140. The image forming unit 140 prints the facsimile data received by facsimile unit 116 on paper. Further, the facsimile unit 116 converts the data stored in the HDD 115 into facsimile data, and transmits the facsimile data to a facsimile machine connected to the PSTN.

The external storage device 117 is mounted with the CD-ROM 118. The CPU 111 is capable of accessing the CD-ROM 118 via the external storage device 117. The CPU 111 loads the program recorded in the CD-ROM 118, which is mounted on the external storage device 117, into the RAM 114 for execution. It is noted that the medium for storing a program executed by the CPU 111 is not limited to the CD-ROM 118. It may be an optical disc (MO (Magnetic Optical Disc)/MD (Mini Disc)/DVD (Digital Versatile Disc)), an IC card, an optical card, or a semiconductor memory such as a mask ROM, an EPROM (Erasable Programmable ROM), or an EEPROM (Electrically EPROM).

Further, the program executed by the CPU 111 is not limited to the program recorded in the CD-ROM 118, and the program stored in the HDD 115 may be loaded into the RAM 114 for execution. In this case, another computer connected to the network 3 may rewrite the program stored in the HDD 115 of the MFP 100, or may additionally write a new program therein. Further, the MFP 100 may download a program from another computer connected to the network 3, and store the program in the HDD 115. The program referred to here includes not only a program directly executable by the CPU 111 but also a source program, a compressed program, an encrypted program and the like.

The operation panel 160 is provided on an upper surface of the MFP 100. The operation panel 160 includes a display unit 161 and an operation unit 163. The display unit 161 is a Liquid Crystal Display (LCD), for example, and displays an instruction menu for a user, information about acquired image data and the like.

The operation unit 163 includes a touch panel 165 and a hard key unit 167. The touch panel 165 is a capacitance type. The touch panel 165 is not limited to the capacitance type, and another type such as a resistive film type, a surface acoustic wave type, an infrared type, and an electromagnetic induction type can be used.

The touch panel 165 detects a position designated by the user on a detection surface. The touch panel 165 is provided with its detection surface being superimposed on an upper surface or a lower surface of the display unit 161. The size of the detection surface of the touch panel 165 and the size of the display surface of the display unit 161 are the same. Therefore, the coordinate system of the display surface and the coordinate system of the detection surface are the same. The touch panel 165 detects the position designated by the user on the display surface of the display unit 161 on the detection surface, and outputs a set of coordinates of the detected position to the CPU 111. Because the coordinate system of the display surface and the coordinate system of the detection surface are the same, the set of coordinates output by the touch panel 165 can be replaced with the set of coordinates of the display surface. Hereinafter, the set of coordinates, which is detected on the detection surface and output by the touch panel 165 when the user gives designation on the display surface of the display unit 161, is also referred to as the set of coordinates of the display surface of the display unit 161.

The touch panel 165 is a multi-touch screen panel. Therefore, when the user simultaneously designates a plurality of positions on the display surface of the display unit 161 with a plurality of fingers, the touch panel 165 detects the plurality of positions designated by the user on the display surface of the display unit 161 on the detection surface, and outputs a plurality of sets of coordinates respectively indicating the plurality of detected positions to the CPU 111.

The hard key unit 167 includes a plurality of hard keys. The hard keys are contact switches, for example. The touch panel 165 detects a position designated by the user on the display surface of the display unit 161. In the case where operating the MFP 100, the user is likely to be in an upright attitude, so that the display surface of the display unit 161, an operation surface of the touch panel 165, and the hard key unit 167 are arranged to face upward. This is for the purpose of enabling the user to easily view the display surface of the display unit 161 and easily give an instruction on the operation unit 163 with his or her fingers.

Figure 3:
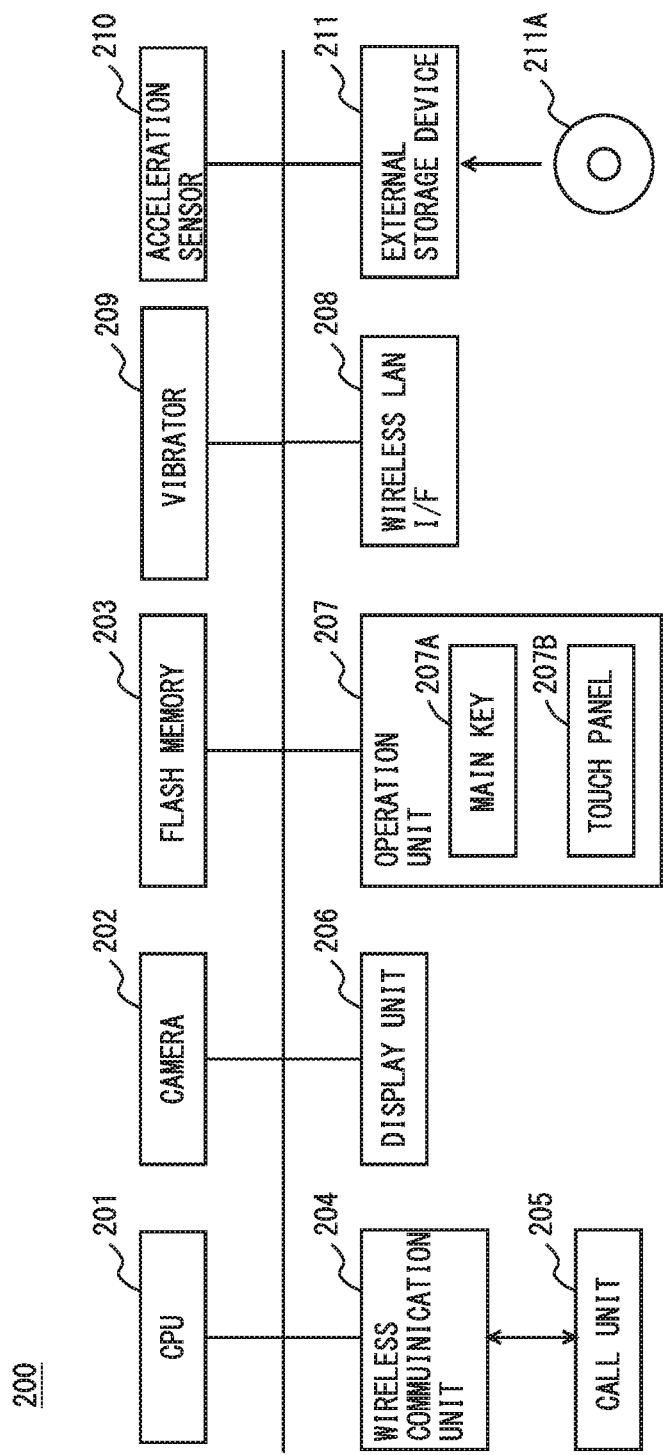
FIG. 3 is a block diagram showing an outline of a configuration of a portable information device.

FIG. 3 is a block diagram showing an outline of the configuration of the portable information device. Referring to FIG. 3, the portable information device 200 in the present embodiment includes a CPU 201 for controlling the entire portable information device 200, a camera 202, a flash memory 203 for storing data in a nonvolatile manner, a radio communication unit 204 connected to a call unit 215, a display unit 206 for displaying information, an operation unit 207 for accepting an operation by the user, a wireless LAN interface (I/F) 208, a vibrator 209, an acceleration sensor 210, and an external storage device 211.

The display unit 206 is a display device such as a liquid crystal display (LCD) and an organic ELD and displays an image. The operation unit 207 includes a main key 207A and a touch panel 207B. The touch panel 207B is a capacitance type. The touch panel 207B is not limited to the capacitance type, and another type such as a resistive film type, a surface acoustic wave type, an infrared type, and an electromagnetic induction type can be used.

The touch panel 207B detects a position designated by the user on the detection surface. The touch panel 207B is provided with its detection surface being superimposed on an upper surface or a lower surface of the display unit 206. The size of the detection surface of the touch panel 207B and the size of the display surface of the display unit 206 are the same. Therefore, the coordinate system of the display surface and the coordinate system of the detection surface are the same. The touch panel 207B detects a position designated by the user on the display surface of the display unit 206 on the detection surface, and outputs a set of coordinates of the detected position to the CPU 201. Because the coordinate system of the display surface and the coordinate system of the detection surface are the same, the set of coordinates output by the touch panel 207B can be replaced with the set of coordinates of the display surface. Hereinafter, the set of coordinates, which is detected on the detection surface and output by the touch panel 207B when the user gives designation on the display surface of the display unit 206, is also referred to as the set of coordinates of the display surface of the display unit 206.

The touch panel 207B is a multi-touch screen panel. Therefore, in the case where the user simultaneously designates a plurality of positions with a plurality of fingers on the display surface of the display unit 206, the touch panel 207B detects the plurality of positions designated by the user on the display surface of the display unit 206 on the detection surface, and outputs a plurality of sets of coordinates respectively indicating the plurality of detected positions to the CPU 201.

The camera 202 includes a lens and an optoelectronic transducer and forms an image of light collected by the lens on the optoelectronic transducer. The optoelectronic transducer transduces the received light and outputs the image data to the CPU 201. The optoelectronic transducer is a CMOS (Complementary Metal Oxide Semiconductor) sensor or a CCD (Charge Coupled Device) sensor, for example.

The radio communication unit 204 communicates by radio with the mobile phone base station connected to a telephone communication network. The radio communication unit 204 connects the portable information device 200 to the telephone communication network to enable a call by using the call unit 205. The radio communication unit 204 decodes a voice signal obtained by demodulating a radio signal received from the mobile phone base station and outputs the decoded signal to the call unit 205. Further, the radio communication unit 204 encodes voice input from the call unit 205 and transmits the encoded signal to the mobile phone base station. The call unit 205 includes a microphone and a speaker. The voice input from the radio communication unit 204 is output from the speaker, and the voice input from the microphone is output to the radio communication unit 204. Further, the radio communication unit 204 is controlled by the CPU 201 and connects the portable information device 200 to an email server to transmit and receive emails.

The wireless LAN I/F 208 is an interface that communicates with the radio station 5 to connect the portable information device 200 to the network 3. The respective IP (Internet Protocol) addresses of the MFP 100, 100A, 100B are registered in the portable information device 200, so that the portable information device 200 can communicate with the MFPs 100, 100A, 100B to transmit and receive data. While the case where the portable information device 200 uses the wireless LAN I/F 208 to communicate with the MFPs 100, 100A, 100B is described as an example in the present embodiment, other communication methods may be used for communication. Specifically, in the case where the portable information device 200 and the MFPs 100, 100A, 100B are equipped with a short-range wireless device such as Bluetooth (registered trademark), the portable information device 200 may perform one-to-one communication with any of the MFPs 100, 100A, 100B.

The flash memory 203 stores a program executed by the CPU 201 or data necessary to execute the program. The CPU 201 loads the program recorded in the flash memory 203 into the RAM included in the CPU 201 for execution.

The vibrator 209 is controlled by the CPU 201 and generates vibration. The vibrator 209 is attached to a casing of the portable information device 200 and includes a motor and a weight attached to a shaft of the motor at a position different from its center of gravity. The weight is rotated by the rotation of the motor, and thus the vibrator 209 vibrates. The vibration of the vibrator 209 is transmitted to the casing of the portable information device 200, and the entire portable information device 200 vibrates. A frequency of vibration of the vibrator 209 is defined according to the number of rotations of the motor.

The acceleration sensor 210 is a three-axis acceleration sensor that measures acceleration in three directions of an X axis, a Y axis and a Z axis. The acceleration sensor 210 outputs the detected acceleration to the CPU 201.

The external storage device 211 is removably attached to the portable information device 200. A CD-ROM 211A storing the remote operation program can be mounted on the external storage device 211. The CPU 201 can access the CD-ROM 211A via the external storage device 211. The CPU 201 can load the remote operation program recorded in the CD-ROM 211A mounted on the external storage device 211 into the RAM included in the CPU 201 for execution.

The program recorded in the flash memory 203 or the CD-ROM 210A has been described as a program executed by the CPU 201. However, another computer connected to the network 3 may rewrite the program stored in the flash memory 203 or additionally write a new program. Further, the portable information device 200 may download a program from another computer connected to the network 3. The program referred to here includes not only a program directly executable by the CPU 201 but also a source program, a compressed program, an encrypted program and the like.

The program executed by the CPU 201 may be stored not only in the CD-ROM 211A but also in another medium such as an optical disk (MO/MD/DVD), an IC card, an optical card, and a semiconductor memory such as a mask ROM, an EPROM, and an EEPROM.

Figure 4:
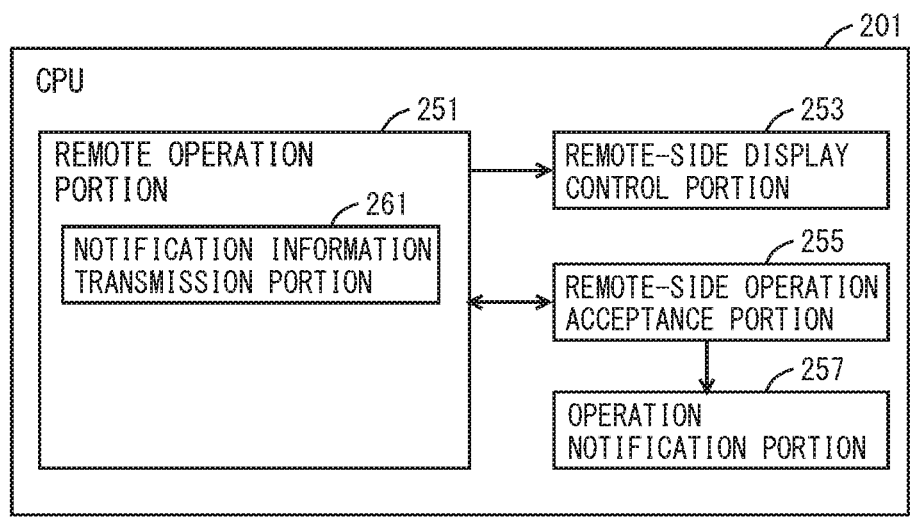
FIG. 4 is a block diagram showing one example of an outline of functions of a CPU included in the portable information device in the first embodiment.

FIG. 4 is a block diagram showing one example of the outline of the functions of the CPU included in the portable information device in the first embodiment. The functions shown in FIG. 4 are formed in the CPU 201 in the case where the CPU 201 included in the portable information device 200 executes the remote operation program stored in the flash memory 203 or the CD-ROM 211A. Referring to FIG. 4, the CPU 201 includes a remote operation portion 251, a remote-side display control portion 253, a remote-side operation acceptance portion 255, and an operation notification portion 257.

The remote operation portion 251 establishes a communication path with the remote control device that is a target of the remote operation. Specifically, if the user operates the operation unit 207 and designates any of the MFPs 100, 100A, 100B as the remote control device that is the target of the remote operation, the remote operation portion 251 controls the wireless LAN I/F 208, transmits a connection request to the remote control device, and establishes a communication path with the remote control device. The case where the user designates the MFP 100 as the remote control device is described here as an example. In this case, the remote operation portion 251 establishes the communication path with the MFP 100.

The remote operation portion 251 controls the wireless LAN I/F 208, receives an image transmitted by the MFP 100, and outputs the image received from the MFP 100 to the remote-side display control portion 253. The remote-side display control portion 253 controls the display unit 206, displays the image received from the remote operation portion 251 in the display unit 206, and outputs the image to the remote-side operation acceptance portion 255. The image transmitted by the MFP 100 is an image of an operation screen.

The remote-side operation acceptance portion 255 receives the image from the remote-side display control portion 253, and receives a set of coordinates from the touch panel 207B. In response to reception of the set of coordinates from the touch panel 207B, the remote-side operation acceptance portion 255 specifies a position corresponding to the set of coordinates in the image received from the remote-side display control portion 253, outputs a set of coordinates indicating the position in the image to the remote operation portion 251, and outputs a notification instruction to the operation notification portion 257.

In response to reception of the set of coordinates from the remote-side operation acceptance portion 255, the remote operation portion 251 controls the wireless LAN I/F 208, and transmits the set of coordinates received from the remote-side operation acceptance portion 255 to the MFP 100.

In response to reception of the notification instruction from the remote-side operation acceptance portion 255, the operation notification portion 257 notifies the user of acceptance of an operation. The operation notification portion 257 can notify the user of the acceptance of the operation by a plurality of notification methods. The plurality of notification methods are distinguished by mediums. Here, the operation notification portion 257 can notify the user of the acceptance of the operation by any of a notification method using vibration as the medium, a notification method using sound as the medium, and a notification method using an image as the medium. Further, the operation notification portion 257 can make notification to a variety of degrees. The degree of notification is determined in advance from a predetermined range of the degree. The operation notification portion 257 makes notification to the predetermined degree within the range of the degree to which the notification can be made.

The operation notification portion 257 defines any of the notification method using vibration as the medium, the notification method using sound as the medium, and the notification method using an image as the medium as a default notification method. In the case where the notification method using vibration as the medium is defined as the default notification method, the operation notification portion 257 controls the vibrator 209, and drives the vibrator 209 at a predetermined frequency within a range of frequency at which the vibrator 209 is capable of vibrating. Thus, the user is notified of the acceptance of the operation by the vibration of the vibrator 209 at the predetermined frequency.

In the case where the notification method using sound as the medium is defined as the default notification method, the operation notification portion 257 controls the speaker included in the call unit 205 to generate sound in predetermined volume within a range of volume in which the speaker is capable of outputting sound. Thus, the user is notified of the acceptance of the operation by the generation of the sound in the predetermined volume from the speaker.

In the case where the notification method using an image as the medium is defined as the default notification method, the operation notification portion 257 displays a predetermined image in a predetermined size within a range of a size of an image at a position specified by a set of coordinates received from the touch panel 207B on the display surface of the display unit 206 on an image displayed in the display unit 206 in a superimposed manner. Thus, the user is notified of the acceptance of the operation by the display of the predetermined image in the predetermined size at the position designated by the user in the display unit 206.

The remote control portion 251 includes a notification information transmission portion 261. When a communication path is established with the MFP 100 that is the remote control device, the notification information transmission portion 261 transmits notification information to the MFP 100. The notification information includes a type of the medium used to make notification by the operation notification portion 257, a range of a degree, and a degree. In the case where the notification method using vibration as the medium is defined as the default notification method, the notification information transmission portion 261 transmits the notification information in which the type of the medium is specified as "vibration", the range of the degree is specified as a range of frequency at which the operation notification portion 257 is capable of vibrating the vibrator 209, the degree is specified as a predetermined frequency at which the vibrator 209 vibrates. In the case where the notification method using sound as the medium is defined as the default notification method, the notification information transmission portion 261 transmits the notification information in which the type of the medium is specified as "sound", the range of the degree is specified as a range of volume in which the speaker included in the call unit 205 is capable of outputting sound, and the degree is specified as predetermined volume in which the speaker outputs the sound. In the case where the notification method using an image as the medium is defined as the default notification method, the notification information transmission portion 261 transmits the notification information in which the type of the medium is specified as an "image", the range of the degree is specified as a range of a size in which the display unit 206 is capable of displaying an image, and the degree is specified as a predetermined size in which the portable information device 200 displays the image.

Figure 5:
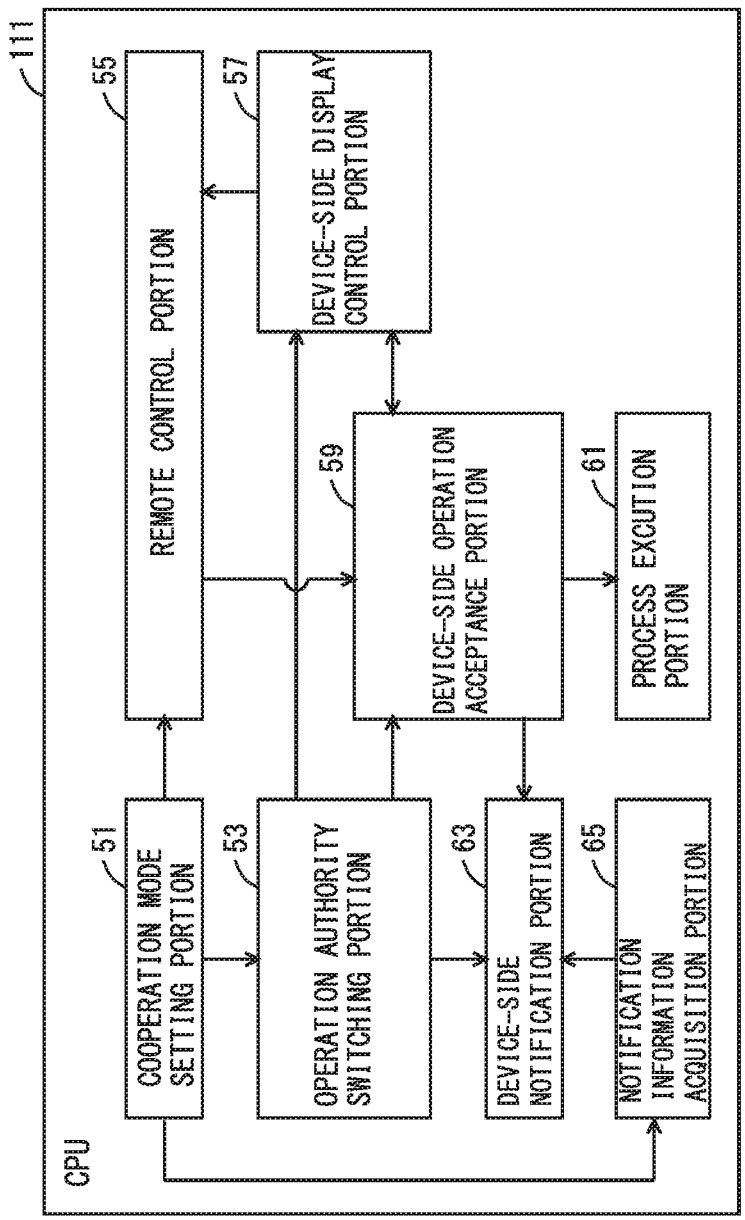
FIG. 5 is a block diagram showing one example of functions of a CPU included in an MFP in the first embodiment.

FIG. 5 is a block diagram showing one example of the functions of the CPU included in the MFP in the first embodiment. The functions shown in FIG. 5 are formed in the CPU 111 in the case where the CPU 111 included in the MFP 100 executes a control program stored in the ROM 113, the HDD 115, and the CD-ROM 118.

Referring to FIG. 5, the CPU 111 includes a cooperation mode setting portion 51, an operation authority switching portion 53, a remote control portion 55, a device-side display control portion 57, a device-side operation acceptance portion 59, a process execution portion 61, a device-side notification portion 63, and a notification information acquisition portion 65.

The cooperation mode setting portion 51 sets the MFP 100 in a cooperation mode. The cooperation mode setting portion 51 controls the communication I/F unit 112, and establishes a communication path with the remote operation device in response to a request from the remote operation device. When the communication path is established with the remote operation device, the cooperation mode setting portion 51 sets the MFP 100 in the cooperation mode. During a period in which the communication path is established with the remote operation device, the cooperation mode setting portion 51 keeps the MFP 100 in the cooperation mode. The cooperation mode setting portion 51 cancels the cooperation mode in response to disconnection of the communication path with the remote operation device. When setting the MFP 100 in the cooperation mode, the cooperation mode setting portion 51 outputs path identification information for identifying the communication path established with the remote operation device to the remote control portion 55 and the notification information acquisition portion 65. Further, during a period in which the cooperation mode is set, the cooperation mode setting portion 51 outputs a cooperation signal indicating that the cooperation mode is set to the operation authority switching portion 53.

Because the portable information device 200 is specified here as the remote operation device of the MFP 100, when the communication I/F unit 112 receives the communication request from the portable information device 200, the cooperation mode setting portion 51 establishes the communication path with the portable information device 200 and set the MFP 100 in the cooperation mode.

The operation authority switching portion 53 detects that the cooperation mode is set based on the cooperation signal received from the cooperation mode setting portion 51. During a period in which the cooperation mode is set, the operation authority switching portion 53 switches the device having operation authority to any of the touch panel 165 and the portable information device 200 that is the remote operation device. In the stage where the cooperation mode is started, that is, the stage where the cooperation signal is first received from the cooperation mode setting portion 51, the operation authority switching portion 53 switches the holder of the operation authority to the portable information device 200. In response to designation of a predetermined switch key among the plurality of hard keys of the hard key unit 167 of the operation panel 160 by the user with the holder of the operation authority being switched to the remote operation device, the operation authority switching portion 53 switches the holder of the operation authority to the touch panel 165. Further, in response to designation of the switch key of the hard key unit 167 of the operation panel 160 by the user with the holder of the operation authority being switched to the touch panel 165, the operation authority switching portion 53 switches the holder of the operation authority to the remote operation device. The operation authority switching portion 53 outputs a switch signal, indicating which one of the remote operation device and the touch panel 165 is the holder of the operation authority, to the device-side operation acceptance portion 59, the device-side display control portion 57, and the device-side notification portion 63. The switch signal indicates that the holder of the operation authority is the remote operation device in the case where the holder of the operation authority is switched to the remote operation device, and indicates that the holder of the operation authority is the touch panel 165 in the case where the holder of the operation authority is switched to the touch panel 165. While the holder of the operation authority is switched here by the designation of the switch key by the user, the holder of the operation authority may be switched by another method. For example, the portable information device 200 that is the remote operation device may determine the time to switch the holder of the operation authority. Further, in the case where the portable information device 200 executes a predetermined application program, the operation authority switching portion 53 may assign the operation authority to both of the touch panel 165 and the portable information device 200.

The device-side operation acceptance portion 59 gives an instruction to display an operation screen for accepting an operation by the user to the device-side display control portion 57, and accepts an operation of inputting in the operation unit 163 in accordance with the operation screen by the user. In response to the acceptance of the operation by the user, the device-side operation acceptance portion 59 outputs the notification instruction to the device-side notification portion 63. Specifically, the device-side operation acceptance portion 59 outputs operation screen identification information for identifying an operation screen to the device-side display control portion 57. In an initial stage, the device-side operation acceptance portion 59 outputs screen identification information of a predetermined operation screen to the device-side display control portion 57. The initial stage is the time when power is applied to the MFP 100, or the time when the MFP 100 is recovered from a sleep state where electricity consumption is low, for example.

The device-side display control portion 57 sometimes receives the switch signal from the operation authority switching portion 53. In the case where not receiving the switch signal from the operation authority switching portion 53, in response to reception of the screen identification information from the device-side operation acceptance portion 59, the device-side display control portion 57 reads out an image of the operation screen specified by the screen identification information from the HDD 115, and displays the read image of the operation screen in the display unit 161.

In the case where receiving the switch signal indicating that the holder of the operation authority is the touch panel 165 from the operation authority switching portion 53, in response to reception of the screen identification information from the device-side operation acceptance portion 59, the device-side display control portion 57 reads out an image of the operation screen specified by the screen identification information from the HDD 115, and outputs the image of the operation screen read out from the HDD 115 to the remote control portion 55. Further, in the case where receiving the switch signal indicating that the holder of the operation authority is the remote operation device, the device-side display control portion 57 displays an image indicating that a remote operation is in progress in the display unit 161. Thus, in the case where the holder of the operation authority is switched to the touch panel 165, the image of the operation screen is displayed in the display unit 161. In the case where the holder of the operation authority is switched to the remote operation device, the image indicating that the remote operation is in progress is displayed in the display unit 161. Therefore, the user can know which one of the touch panel 165 and the remote operation device can be operated by viewing the image displayed in the display unit 161.

In the case where not receiving the switch signal from the operation authority switching portion 53, or in the case where receiving the switch signal indicating that the holder of the operation authority is the touch panel 165 from the operation authority switching portion 53, the device-side operation acceptance portion 59 controls the touch panel 165. In response to reception of a set of coordinates from the touch panel 165 after outputting the screen identification information to the device-side display control portion 57, the device-side operation acceptance portion 59 determines an operation by the user based on the set of coordinates received from the touch panel 165. In the case where determining the operation by the user, the device-side operation acceptance portion 59 outputs the notification instruction to the device-side notification portion 63.

The device-side operation acceptance portion 59 specifies a position designated by the user in the operation screen based on the set of coordinates received from the touch panel 165. Specifically, the position specified by the set of coordinates received from the touch panel 165 in the image of the operation screen displayed in the display unit 161 is specified as a position in the operation screen designated by the user. The device-side operation acceptance portion 59 determines an operation corresponding to the position specified in the operation screen. For example, in the case where the operation screen includes a setting button to which an operation of setting a setting value is assigned, if the position designated by the user in the operation screen is within the range of the setting button, the operation of setting the setting value is specified as the operation corresponding to the position specified in the operation screen, and a command to set the setting value is output to the process execution portion 61. In the case where the operation screen includes an execution instruction button to which an operation of giving an instruction to execute a process is assigned, if the position designated by the user in the operation screen is within the range of the execution instruction button, an execution instruction operation is specified as the operation corresponding to the position specified in the operation screen, and a command to execute a type of a process specified by the button is output to the process execution portion 61. Further, in the case where the operation screen includes a transition button to which an operation of switching the display to another operation screen is assigned, if the position designated by the user in the operation screen is within the range of the transition button, an operation of making transition of the screen is specified as the operation corresponding to the position specified in the operation screen, and screen identification information associated with the transition button is output to the device-side display control portion 57.

Further, in the case where the portable information device 200 executes a predetermined application program, the portable information device 200 sometimes returns character data. In response to reception of the character data from the portable information device 200 by the communication I/F unit 112, the remote control portion 55 outputs the received character data to the device-side operation acceptance portion 59. In the case where receiving the switch signal indicating that the holder of the operation authority is the touch panel 165 from the operation authority switching portion 53, in response to the reception of the character data from the remote control portion 55, the device-side operation acceptance portion 59 outputs a command to set the character data as a setting value in a setting item corresponding to a region defined by the position designated by the touch panel 165 at that time point in the operation screen to the process execution portion 61.

The process execution portion 61 controls the communication I/F unit 112, the facsimile unit 116, the HDD 115, the external storage device 117, the automatic document feeder 120, the document scanning unit 130, the image forming unit 140, the paper feed unit 150, and the post-processing unit 155, and executes a process. In response to reception of the command to set a setting value from the device-side operation acceptance portion 59, the process execution portion 61 executes the process of setting the setting value. Further, in response to reception of a command to execute a process from the device-side operation acceptance portion 59, the process execution portion 61 executes the type of the process specified by the command. One example of the process executed by the process execution portion 61 is a scanning process, a copying process, a printing process, a facsimile transmitting receiving process and the like. The scanning process is a process of outputting an image of a document scanned by the document scanning unit 130 to at least one of the HDD 115, the external storage device 117, the communication I/F unit 112. The copying process is a process of allowing the image forming unit 140 to form an image of the document scanned by the document scanning unit 130 on a sheet of paper supplied from the paper feed unit 150. The printing process is a process of allowing the image forming unit 140 to form an image of the print data received from a computer connected to the network via the communication I/F unit 112 and an image of the data stored in the HDD 115 or the external storage device 117 on a sheet of paper supplied from the paper feed unit 150. The facsimile transmitting process is a process of allowing the facsimile unit 116 to transmit an image of the facsimile data. The facsimile receiving process is a process of outputting an image of the externally received facsimile data to at least one of the image forming unit 140, the HDD 115, the external storage device 117, and the communication I/F unit 112.

The remote control portion 55 receives an image of an operation screen from the device-side display control portion 57. In the case where receiving the path identification information from the cooperation mode setting portion 51, the remote control portion 55 controls the communication I/F unit 112, and transmits the image of the operation screen received from the device-side display control portion 57 to the portable information device 200 via the communication path specified by the path identification information. Further, during a period in which the communication path specified by the path identification information received from the cooperation mode setting portion 51 is established, the remote control portion 55 transmits the image of the operation screen to the portable information device 200 every time an image of an operation screen is received from the device-side display control portion 57.

The portable information device 200, which is the remote operation device that receives the image of the operation screen, sometimes returns a set of coordinates indicating a position in the image of the transmitted operation screen as described above. In response to reception of the set of coordinates from the portable information device 200 by the communication unit 112, the remote control portion 55 outputs the received set of coordinates to the device-side operation acceptance portion 59.

In the case where receiving the switch signal indicating that the holder of the operation authority is the remote operation device from the operation authority switching portion 53, the device-side operation acceptance portion 59 does not control the touch panel 165. Similarly to the case where receiving the set of coordinates from the touch panel 165, in response to reception of the set of coordinates from the remote control portion 55, the device-side operation acceptance portion 59 determines an operation by the user based on a set of coordinates received from the remote control portion 55. The device-side operation acceptance portion 59 specifies a position designated by the user in the operation screen based on the set of coordinates received from the remote control portion 55. Specifically, the position specified by the set of coordinates received from the remote control portion 55 in the image of the operation screen is specified as the position designated by the user in the operation screen, and an operation corresponding to the position specified in the operation screen is determined. In the case where receiving the switch signal indicating that the holder of the operation authority is the remote operation device from the operation authority switching portion 53, even if determining an operation by the user, the device-side operation acceptance portion 59 does not output the notification instruction to the device-side notification portion 63.

In the case where receiving the path identification information from the cooperation mode setting portion 51, the notification information acquisition portion 65 controls the communication I/F unit 112, communicates with the portable information device 200, which is the remote operation device, via the communication path specified by the path identification information, and acquires the notification information from the portable information device 200. The notification information acquisition portion 65 outputs the acquired notification information to the device-side notification portion 63.

The device-side notification portion 63 can notify the user of acceptance of an operation by a plurality of notification methods. The device-side notification portion 63 can notify the user of the acceptance of the operation by two notification methods, which are a first notification method and a second notification method. The notification method is defined by the medium used to make notification. The first notification method uses sound as the medium, and the second notification method uses an image as the medium. Further, the device-side notification portion 63 can make notification to a variety of degrees. The degree of notification is defined in advance from a predetermined range of the degree. The device-side notification portion 63 makes notification to the predetermined degree within the range of the degree to which the notification can be made.

The device-side notification portion 63 sometimes receives the switch signal from the operation authority switching portion 53. In the case where not receiving the switch signal from the operation authority switching portion 53, in response to reception of the notification instruction from the device-side operation acceptance portion 59, the device-side notification portion 63 notifies the user of the acceptance of the operation by the default notification method to the default degree.

Further, in the case where receiving the switch signal indicating that the holder of the operation authority is the touch panel 165 from the operation authority switching portion 53, the device-side notification portion 63 determines the notification method and the degree based on the notification information received from the notification information acquisition portion 65. The notification information includes a type of the medium and the range of a degree, and a degree.

The device-side notification portion 63 compares the type of the medium included in the notification information with the type of the medium of the default notification method. If both are the same, the device-side notification portion 63 determines to use the default notification method. In the case where determining to use the default notification method, the device-side notification portion 63 compares the degree included in the notification information with the default degree. If both are the same, the device-side notification portion 63 determines to make notification to the default degree. If they are different from each other, the device-side notification portion 63 determines the degree of the notification to be made by the default notification method based on the range and the degree included in the notification information.

In the case where the type of the medium included in the notification information and the type of the medium of the default notification method are different from each other, if it is possible to make notification by the notification method using the type of the medium included in the notification information, the device-side notification portion 63 determines to use the notification method using the type of the medium included in the notification information. In the case where determining to use the notification method using the type of the medium included in the notification information, the device-side notification portion 63 determines the degree of the notification to be made by the notification method using the type of the medium included in the notification information based on the range and the degree included in the notification information.

In the case where the type of the medium included in the notification information and the type of the medium of the default notification method are different from each other, if it is not possible to make notification by the notification method using the type of the medium included in the notification information, the device-side notification portion 63 determines to use any notification method by which notification can be made. Further, the device-side notification portion 63 determines the degree of the notification to be made by the determined notification method based on the range of the degree and the degree included in the notification information. A ratio of the degree included in the notification information to the range of the degree included in the notification information is calculated, and the degree having the same ratio as the calculated ratio to the range of the degree to which notification can be made by the determined notification method is determined.

In the case where receiving the switch signal indicating that the holder of the operation authority is the touch panel 165 from the operation authority switching portion 53, in response to reception of the notification instruction from the device-side operation acceptance portion 59, the device-side notification portion 63 makes notification by using the medium that is defined by the determined notification method to the determined degree. In the case where receiving the switch signal indicating that the holder of the operation authority is the remote operation device from the operation authority switching portion 53, the device-side notification portion 63 does not make notification even if the notification instruction is received from the device-side operation acceptance portion 59.

As for the operation of the device-side notification portion 63, notification information acquired from the portable information device 200 that is the remote operation device will be described below according to each case.

<The case where the notification method using vibration as the medium is the default notification method in the portable information device.>

In this case, in response to detection by the touch panel 207B of a position designated by the user, the portable information device 200 vibrates the vibrator 209 at a predetermined frequency. Therefore, in the notification information acquired by the notification information acquisition portion 65 from the portable information device 200, the type of the medium is "vibration", the range of the degree is the range of the frequency, and the degree is the frequency.

(1) The case where the default notification method is not defined in the device-side notification portion 63.

Because the notification method is not defined, in the case where the switch signal is not received from the operation authority switching portion 53, the device-side notification portion 63 does not notify the user of the acceptance of an operation even if the notification instruction is received from the device-side operation acceptance portion 59.

In the notification information acquired by the notification information acquisition portion 65 from the portable information device 200, the type of the medium is "vibration", the range of the degree is the range of the frequency, and the degree is the frequency. Further, the device-side notification portion 63 cannot make notification by the notification method using the "vibration", which is the type of the medium included in the notification information. Therefore, the device-side notification portion 63 determines to use any of the first notification method and the second notification method. Any of the first notification method and the second notification method may be arbitrarily selected or defined in advance. The device-side notification portion 63 calculates a ratio of the degree included in the notification information to the range of the degree included in the notification information. For example, a ratio of the frequency included in the notification information to the range of the frequency included in the notification information is specified as 60%.

(1-1) The case where the first notification method is selected.

For the first notification method, sound is specified as the medium, and volume of the sound is specified as the degree. The device-side notification portion 63 performs a setting operation such that sound is generated in the volume of 60% of the range of the volume in which the speaker 119 is capable of generating sound. In the case where receiving the switch signal indicating that the holder of the operation authority is the touch panel 165 from the operation authority switching portion 53, in response to reception of the notification instruction from the device-side operation acceptance portion 59, the device-side notification portion 63 controls the speaker 119 to output the sound in the volume of the determined degree. When the user gives designation on the touch panel 207B of the portable information device 200, the vibrator 209 is vibrated by the portable information device 200, and the user is notified of the acceptance of the operation by vibration. In contrast, when the holder of the operation authority is switched to the MFP 100, and the designation is made on the touch panel 165, the user is aurally notified of the acceptance of the operation by sound. Further, because the volume of the sound by which the notification is made to the user has the same ratio to the range of the volume in which the MFP 100 is capable of outputting sound as a ratio of the frequency at which the portable information device 200 vibrates to the range of the frequency at which the portable information device 200 is capable of vibrating, notification can be made by the sound in the volume proportional to the degree of notification in the portable information device 200.

In the case where receiving the switch signal indicating that the holder of the operation authority is the portable information device 200 from the operation authority switching portion 53, even if receiving the notification instruction from the device-side operation acceptance portion 59, the device-side notification portion 63 does not control the speaker 119.

(1-2) The case where the second notification method is selected.

For the second notification method, an image is specified as the medium, and a size of the image is specified as the degree. The device-side notification portion 63 performs a setting operation such that the image is displayed in the size of 60% of the range of the size in which the display unit 161 is capable of displaying an image. In the case where receiving the switch signal indicating that the holder of the operation authority is the touch panel 165 from the operation authority switching portion 53, in response to reception of the notification instruction from the device-side operation acceptance portion 59, the device-side notification portion 63 displays a predetermined image in the set size at a position specified by a set of coordinates received from the touch panel 165 on the display surface of the display unit 161 on an image displayed in the display unit 161 in a superimposed manner. When the user gives designation on the touch panel 207B by the portable information device 200, the vibrator 209 is vibrated by the portable information device 200, and the user is notified of the acceptance of the operation by vibration. In contrast, when the holder of the operation authority is switched to the MFP 100, and the designation is made on the touch panel 165, the user is visually notified of the acceptance of the operation by the display of the image. The image here is preferably associated with vibration. For example, an image of a musical note or a motion picture showing widening rings is preferable. Further, because the size of the image by which the notification is made to the user has the same ratio to the range of the size in which the MFP 100 is capable of outputting an image as the ratio of the frequency at which the portable information device 200 vibrates to the range of the frequency at which the portable information device 200 is capable of vibrating, notification can be made by the image in the size proportional to the degree of the notification in the portable information device 200.

In the case where receiving the switch signal indicating that the holder of the operation authority is the portable information device 200 from the operation authority switching portion 53, even if receiving the notification instruction from the device-side operation acceptance portion 59, the device-side notification portion 63 does not make notification.

(2) The case where the first notification method is defined as the default notification method in the device-side notification portion 63.

Because the first notification method is defined as the default notification method, in the case where the switch signal is not received from the operation authority switching portion 53, in response to reception of the notification instruction from the device-side operation acceptance portion 59, the device-side notification portion 63 controls the speaker 119 to output sound in default volume.

The type of the medium included in the notification information and the type of the medium of the first notification method that is defined as the default notification method are different from each other. Further, the device-side notification portion 63 cannot make notification by the notification method using "vibration", which is the type of the medium included in the notification information. Therefore, the device-side notification portion 63 determines to use the first notification method. The device-side notification portion 63 calculates a ratio of the degree included in the notification information to the range of the degree included in the notification information. For example, a ratio of the frequency included in the notification information to the range of the frequency included in the notification information is specified as 60%. The device-side notification portion 63 performs a setting operation such that sound is generated in the volume of 60% of the range of the volume in which the speaker 119 is capable of generating sound.

In the case where receiving the switch signal indicating that the holder of the operation authority is the touch panel 165 from the operation authority switching portion 53, in response to reception of the notification instruction from the device-side operation acceptance portion 59, the device-side notification portion 63 controls the speaker 119 to output sound in the volume of the determined degree. When the user gives designation on the touch panel 207B of the portable information device 200, the vibrator 209 is vibrated by the portable information device 200, and the user is notified of the acceptance of the operation by vibration. In contrast, when the holder of the operation authority is switched to the MFP 100, and the designation is made on the touch panel 165, the user is aurally notified of the acceptance of the operation by sound. The sound here is preferably associated with vibration. For example, the sound similar to the sound generated when the vibrator 209 vibrates. Further, because the volume of the sound by which the notification is made to the user has the same ratio to the range of the volume in which the MFP 100 is capable of outputting sound as a ratio of the frequency at which the portable information device 200 vibrates to the range of the frequency at which the portable information device 200 is capable of vibrating, notification can be made by the sound in the volume proportional to the degree of notification in the portable information device 200.

In the case where receiving the switch signal indicating that the holder of the operation authority is the portable information device 200 from the operation authority switching portion 53, even if receiving the notification instruction from the device-side operation acceptance portion 59, the device-side notification portion 63 does not control the speaker 119.

(3) The case where the second notification method is defined as the default notification method in the device-side notification portion 63.

Because the second notification method is defined as the default notification method, in the case where the switch signal is not received from the operation authority switching portion 53, in response to reception of the notification instruction from the device-side operation acceptance portion 59, the device-side notification portion 63 displays a default image in a default size at a position specified by a set of coordinates received from the touch panel 165 on the display surface of the display unit 161 on an image displayed in the display unit 161 in a superimposed manner.

The type of the medium included in the notification information and the type of the medium of the second notification method that is defined as the default notification method are different from each other. Further, the device-side notification portion 63 cannot make notification by the notification method using "vibration", which is the type of the medium included in the notification information. Therefore, the device-side notification portion 63 determines to use the second notification method. The device-side notification portion 63 calculates a ratio of the degree included in the notification information to the range of the degree included in the notification information. For example, a ratio of the frequency included in the notification information to the range of the frequency included in the notification information is specified as 60%. The device-side notification portion 63 performs a setting operation such that an image is displayed in the size of 60% of the range of the size in which the display unit 161 is capable of displaying an image.

In the case where receiving the switch signal indicating that the holder of the operation authority is the touch panel 165 from the operation authority switching portion 53, in response to reception of the notification instruction from the device-side operation acceptance portion 59, the device-side notification portion 63 displays a predetermined image in a set size at the position specified by the set of coordinates received from the touch panel 165 on the display surface of the display unit 161 on the image displayed in the display unit 161 in a superimposed manner. The image here is preferably associated with vibration. For example, an image of a musical note or a motion picture showing widening rings is preferable. Further, because the size of the image by which notification is made to the user has the same ratio to the range of the size in which the MFP 100 is capable of outputting an image as a ratio of the frequency at which the portable information device 200 vibrates to the range of the frequency at which the portable information device 200 is capable of vibrating, notification can be made by the image in the size proportional to the degree of the notification in the portable information device 200.

In the case where receiving the switch signal indicating that the holder of the operation authority is the portable information device 200 from the operation authority switching portion 53, even if receiving the notification instruction from the device-side operation acceptance portion 59, the device-side notification portion 63 does not make notification.

<The case where the notification method using sound as the medium is the default notification method in the portable information device>

In this case, in response to detection by the touch panel 207B of a position designated by the user, the portable information device 200 generates sound in predetermined volume. Therefore, in the notification information acquired by the notification information acquisition portion 65 from the portable information device 200, the type of the medium is "sound", the range of the degree is the range of the volume of the sound, and the degree is the volume of the sound.

(1) The case where the default notification method is not defined in the device-side notification portion 63.

The device-side notification portion 63 can make notification by the first notification method using "sound", which is the type of the medium included in the notification information. Therefore, the device-side notification portion 63 determines to use the first notification method. The device-side notification portion 63 calculates a ratio of the degree included in the notification information to the range of the degree included in the notification information. For example, a ratio of the frequency included in the notification information to the range of the frequency included in the notification information is specified as 60%. The device-side notification portion 63 performs a setting operation such that sound is generated in the volume of 60% of the range of the volume in which the speaker 119 is capable of generating sound.

In the case where not receiving the switch signal from the operation authority switching portion 53, even if receiving the notification instruction from the device-side operation acceptance portion 59, the device-side notification portion 63 does not notify the user of the acceptance of the operation. In the case where receiving the switch signal indicating that the holder of the operation authority is the touch panel 165 from the operation authority switching portion 53, in response to reception of the notification instruction from the device-side operation acceptance portion 59, the device-side notification portion 63 controls the speaker 119 to output the sound in the volume of the determined degree.

(2) The case where the first notification method is defined as the default notification method in the device-side notification portion 63.

The type of the medium included in the notification information and the type of the medium of the first notification method that is defined as the default notification method are the same. Therefore, the device-side notification portion 63 determines to use the first notification method. The device-side notification portion 63 calculates a ratio of the degree included in the notification information to the range of the degree included in the notification information. For example, a ratio of the frequency included in the notification information to the range of the frequency included in the notification information is specified as 60%. The device-side notification portion 63 performs a setting operation such that sound is generated in the volume of 60% of the range of the volume in which the speaker 119 is capable of generating sound.

In the case where not receiving the switch signal from the operation authority switching portion 53, in response to reception of the notification instruction from the device-side operation acceptance portion 59, the device-side notification portion 63 controls the speaker 119 to generate default sound in default volume. In the case where receiving the switch signal indicating that the holder of the operation authority is the touch panel 165 from the operation authority switching portion 53, in response to reception of the notification instruction from the device-side operation acceptance portion 59, the device-side notification portion 63 controls the speaker 119 to output the sound in the volume of the determined degree.

(3) The case where the second notification method is defined as the default notification method in the device-side notification portion 63.

The type of the medium included in the notification information and the type of the medium of the second notification method that is defined as the default notification method are different from each other. Further, the device-side notification portion 63 can make notification by the first notification method using "sound", which is the type of the medium included in the notification information. Therefore, the device-side notification portion 63 determines to use the first notification method. In the case where determining to use the first notification method, the device-side notification portion 63 calculates a ratio of the degree included in the notification information to the range of the degree included in the notification information. For example, a ratio of the volume of the sound included in the notification information to the range of the volume of the sound included in the notification information is specified as 60%. The device-side notification portion 63 performs a setting operation such that sound is generated in the volume of 60% of the range of the volume in which the speaker 119 is capable of generating sound.

In the case where not receiving the switch signal from the operation authority switching portion 53, in response to reception of the notification instruction from the device-side operation acceptance portion 59, the device-side notification portion 63 displays a default image in a default size at a position specified by a set of coordinates received from the touch panel 165 on the display surface of the display unit 161 on an image displayed in the display unit 161 in a superimposed manner. In the case where receiving the switch signal indicating that the holder of the operation authority is the touch panel 165 from the operation authority switching portion 53, in response to reception of the notification instruction from the device-side operation acceptance portion 59, the device-side notification portion 63 controls the speaker 119 to output sound in the volume of the determined degree. When the user gives designation on the touch panel 207B of the portable information device 200, the user is notified of the acceptance of the operation by generation of the sound in the predetermined volume by the portable information device 200. In contrast, when the holder of the operation authority is switched to the MFP 100, and the designation is made on the touch panel 165, the user is aurally notified of the acceptance of the operation by sound. Further, because the volume of the sound by which the notification is made to the user has the same ratio to the range of the volume in which the MFP 100 is capable of outputting sound as a ratio of the volume in which the portable information device 200 outputs the sound to the range of the volume in which the portable information device 200 is capable of outputting sound, notification can be made by the sound in the volume proportional to the degree of notification in the portable information device 200. Therefore, even in the case where the user operates any of the portable information device 200 and the MFP 100, the degree of the volume of the sound generated in response to the acceptance of the operation can be the same.

<The case where the notification method using an image as the medium is the default notification method in the portable information device.>

In this case, in response to detection by the touch panel 207B of a position designated by the user, the portable information device 200 displays a predetermined image. Therefore, in the notification information acquired by the notification information acquisition portion 65 from the portable information device 200, the type of the medium is an "image", the range of the degree is the range of the size of the image, and the degree is the size of the image (1) The case where the default notification method is not defined in the device-side notification portion 63.

The device-side notification portion 63 can make notification by the second notification method using an "image", which is the type of the medium included in the notification information. Therefore, the device-side notification portion 63 determines to use the second notification method. The device-side notification portion 63 calculates a ratio of the degree included in the range of the degree included in the notification information. For example, a ratio of the size of the image included in the notification information to the range of the size of the image included in the notification information is specified as 60%. The device-side notification portion 63 performs a setting operation such that the image is displayed in the size of 60% of the range of the size in which the display unit 161 is capable of displaying an image.

In the case where not receiving the switch signal from the operation authority switching portion 53, even if receiving the notification instruction from the device-side operation acceptance portion 59, the device-side notification portion 63 does not notify the user of the acceptance of the operation. In the case where receiving the switch signal indicating that the holder of the operation authority is the touch panel 165 from the operation authority switching portion 53, in response to reception of the notification instruction from the device-side operation acceptance portion 59, the device-side notification portion 63 displays a predetermined image in a set size at a position specified by the set of coordinates received from the touch panel 165 on the display surface of the display unit 161 on an image displayed in the display unit 161 in a superimposed manner.

(2) The case where the first notification method is defined as the default notification method in the device-side notification portion 63.

The type of the medium included in the notification information and the type of the medium of the first notification method that is defined as the default notification method are different from each other. Further, the device-side notification portion 63 can make notification by the second notification method using an "image", which is the type of the medium included in the notification information. Therefore, the device-side notification portion 63 determines to use the second notification method. The device-side notification portion 63 calculates a ratio of the degree included in the notification information to the range of the degree included in the notification information. For example, a ratio of the size of the image included in the notification information to the range of the size of the image included in the notification information is specified as 60%. The device-side notification portion 63 performs a setting operation such that the image is displayed in the size of 60% of the range of the size in which the display unit 161 is capable of displaying an image.

In the case where not receiving the switch signal from the operation authority switching portion 53, in response to reception of the notification instruction from the device-side operation acceptance portion 59, the device-side notification portion 63 controls the speaker 119 to generate default sound in default volume. In the case where receiving the switch signal indicating that the holder of the operation authority is the touch panel 165 from the operation authority switching portion 53, in response to reception of the notification instruction from the device-side operation acceptance portion 59, the device-side notification portion 63 displays a predetermined image in a set size at a position specified by the set of coordinates received from the touch panel 165 on the display surface of the display unit 161 on an image displayed in the display unit 161 in a superimposed manner.

(3) The case where the second notification method is determined as the default notification method in the device-side notification portion 63.

The type of the medium included in the notification information and the type of the medium of the second notification method that is defined as the default notification method are the same. Therefore, the device-side notification portion 63 determines to use the second notification method.

In the case where determining to use the second notification method, the device-side notification portion 63 calculates a ratio of the degree included in the notification information to the range of the degree included in the notification information. For example, a ratio of the size of the image included in the notification information to the range of the size of the image included in the notification information is specified as 60%. The device-side notification portion 63 performs a setting operation such that the image is displayed in the size of 60% of the range of the size in which the display unit 161 is capable of outputting an image.

In the case where not receiving the switch signal from the operation authority switching portion 53, in response to reception of the notification instruction from the device-side operation acceptance portion 59, the device-side notification portion 63 displays a default image in a default size at a position specified by a set of coordinates received from the touch panel 165 on the display surface of the display unit 161 on an image displayed in the display unit 161 in a superimposed manner. In the case where receiving the switch signal indicating that the holder of the operation authority is the touch panel 165 from the operation authority switching portion 53, in response to reception of the notification instruction from the device-side operation acceptance portion 59, the device-side notification portion 63 displays the predetermined image in the set size at the position specified by the set of coordinates received from the touch panel 165 on the display surface of the display unit 161 on the image displayed in the display unit 161 in a superimposed manner.

When the user gives designation on the touch panel 207B of the portable information device 200, the user is notified of the acceptance of the operation by display of the image in the predetermined size being superimposed on the image of the operation screen by the portable information device 200. In contrast, when the holder of the operation authority is switched to the MFP 100, and the designation is made on the touch panel 165, the user is visually notified of the acceptance of the operation by display of the image. Further, because the size of the image by which the notification is made to the user has the same ratio to the range of the size in which the MFP 100 is capable of outputting an image as a ratio of the size in which the portable information device 200 displays the mage to the range of the size in which the portable information device 200 is capable of displaying an image, notification can be made by the image in the size proportional to the degree of the notification in the portable information device 200.

Figure 6:
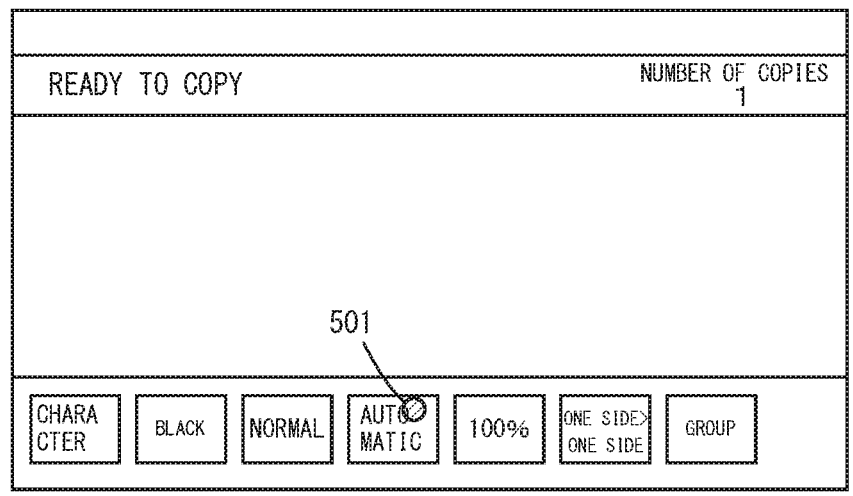
FIG. 6 is a first diagram showing one example of an operation screen in the case where notification is made by a second notification method.

FIG. 6 is a first diagram showing one example of an operation screen in the case where the notification is made by the second notification method. Referring to FIG. 6, an image 501 is displayed on the operation screen 500 in a superimposed manner. The image 501 is a circular image including a position designated by the user at its center. A diameter of the image 501 is variable.

Figure 7:
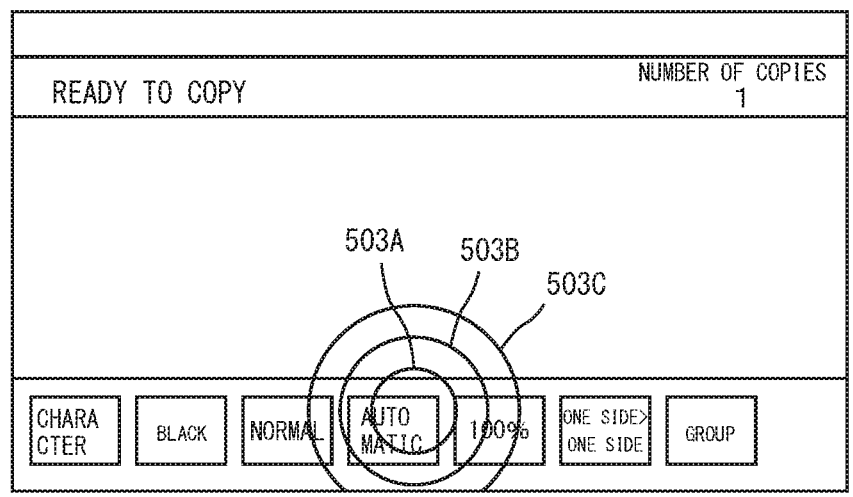
FIG. 7 is a second diagram showing one example of an operation screen in the case where notification is made by the second notification method.

FIG. 7 is a second diagram showing one example of the operation screen in the case where notification is made by the second notification method. Referring to FIG. 7, images 503A, 503B, 503C are displayed on the operation screen 500 in a superimposed manner. The images 503A, 503B, 503C are motion images showing circles. When a predetermined time period elapses from the time when the image 503A is displayed, the image 503B is displayed in addition to the image 503A. Further, when another predetermined time period elapses, the image 504C is displayed in addition to the images 503A, 503B. Further, when yet another predetermined time period elapses, the display of the images 503A, 503B, 503C ends. The images 503A, 503B, 503C are concentric circles, and their center is the position designated by the user. The size of the image is defined by the size of the image 503C, which is the largest among the images 503A, 503B, 503C.

Figure 8:
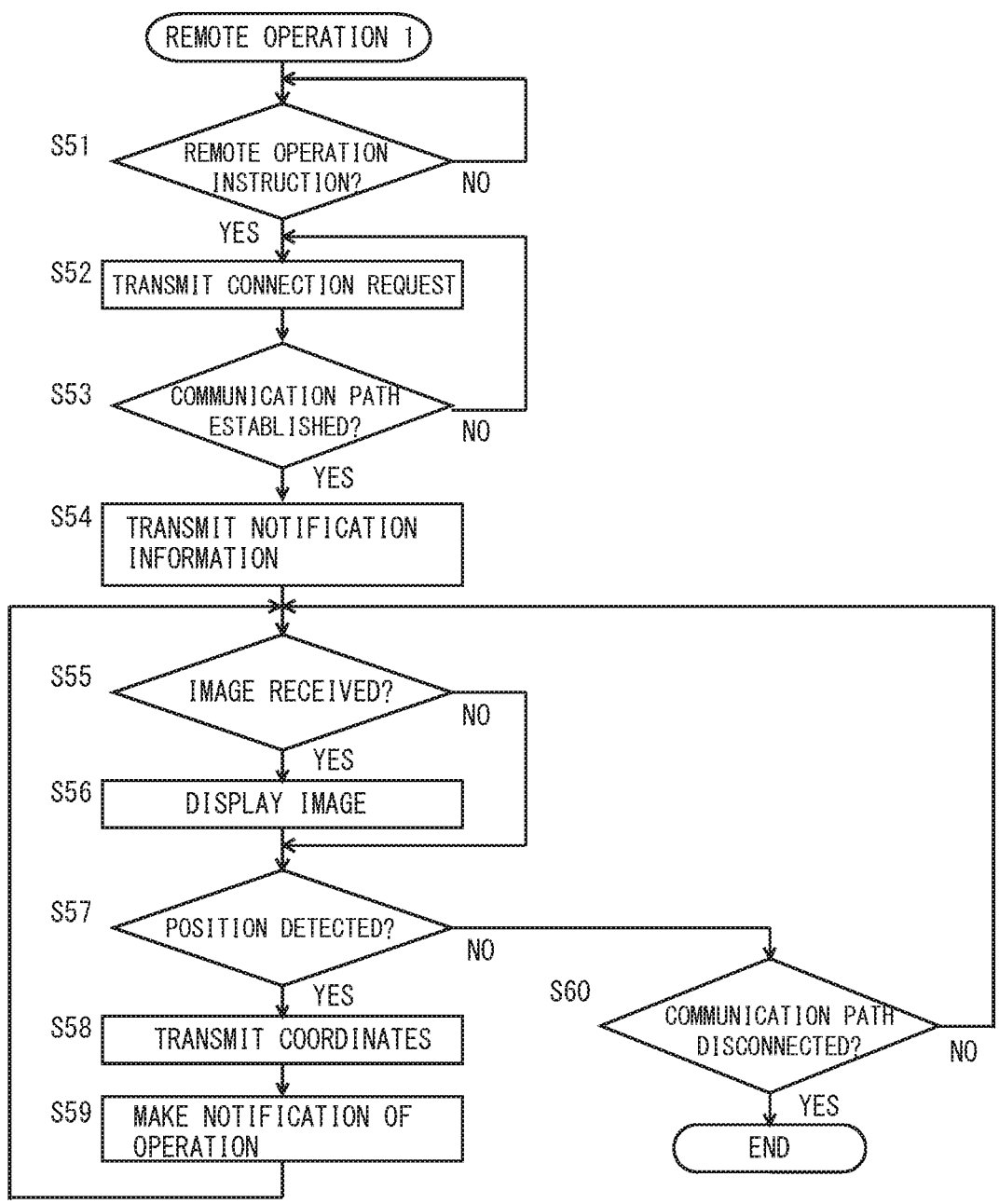
FIG. 8 is a flow chart showing one example of a flow of a remote operation process in the first embodiment.

FIG. 8 is a flow chart showing one example of a flow of a remote operation process in the first embodiment. The remote operation process is a process executed by the CPU 201 in the case where each of the CPUs 201 respectively included in the portable information devices 200, 200A, 200B executes a remote operation program stored in the flash memory 203 or the CD-ROM 211A. The case where the portable information device 200 executes the remote operation process is described here as an example.

Referring to FIG. 8, the CPU 201 determines whether a remote operation instruction has been accepted (step S51). If the operation unit 207 has accepted the remote operation instruction input by the user, the remote operation instruction is accepted. The process waits until the remote operation instruction is accepted (NO in the step S51). If the remote operation instruction is accepted (YES in the step S51), the process proceeds to the step S52. The remote operation instruction includes an instruction to specify the remote control device that is the target of the remote operation. The case where the MFP 100 is specified as the remote control device that is the target of the remote operation is described here as an example.

In the step S52, the CPU 201 transmits the connection request to the MFP 100 that is the target of the remote operation. The CPU 201 controls the wireless LAN I/F 208, and transmits the connection request in order to establish a communication path with the MFP 100. Then, whether the communication path has been established is determined (step S53). The communication path is established by negotiation with the MFP 100. The step S52 is repeated until the communication path is established (NO in the step S53). If the communication path is established (YES in the step S53), The process proceeds to the step S54.

In the step S54, the CPU 201 transmits notification information to the MFP 100 with which the communication path has been established in the step S53. The notification information includes a type of the default medium used to notify the user of the acceptance of the operation, the range of a degree, and a default degree.

In the step S55, whether an image has been received is determined. Whether the wireless LAN I/F 208 has received the image from the MFP 100 via the communication path established in the step S53 is determined. If the image is received, the process proceeds to the step S56. If not, the process proceeds to the step S57.

In the step S56, the received image is displayed in the display unit 206, and the process proceeds to the step S57. In the step S57, whether a position designated by the user in the image has been detected is determined. If the touch panel 207B outputs a set of coordinates, the position designated by the user in the image is detected. If the position designated by the user in the image is detected, the process proceeds to the step S58. If not, the process proceeds to the step S60.

In the step S58, the set of coordinates output by the touch panel 207B is transmitted to the MFP 100 that is the remote control device, and the process proceeds to the step S59. Specifically, the CPU 201 controls the wireless LAN I/F 208, and transmits the set of coordinates output by the touch panel 207B to the MFP 100 via the communication path established in the step S53. In the step S59, the user is notified of the acceptance of the operation by the default notification method to the default degree, and the process returns to the step S55. In the case where the notification method using vibration as the medium is set, the CPU 201 vibrates the vibrator 209 at a default frequency. In the case where the notification method using sound as the medium is set, the CPU 201 outputs sound in default volume from the speaker included in the call unit 205. In the case where the notification method using an image as the medium is set, the CPU 201 displays a default image in a default size on an image displayed in the display unit 206 in a superimposed manner.

On the one hand, in the step S60, whether the communication path established in the step S53 has been disconnected is determined. If the communication path is disconnected, the process ends. If not, the process returns to the step S55.

Figure 9:
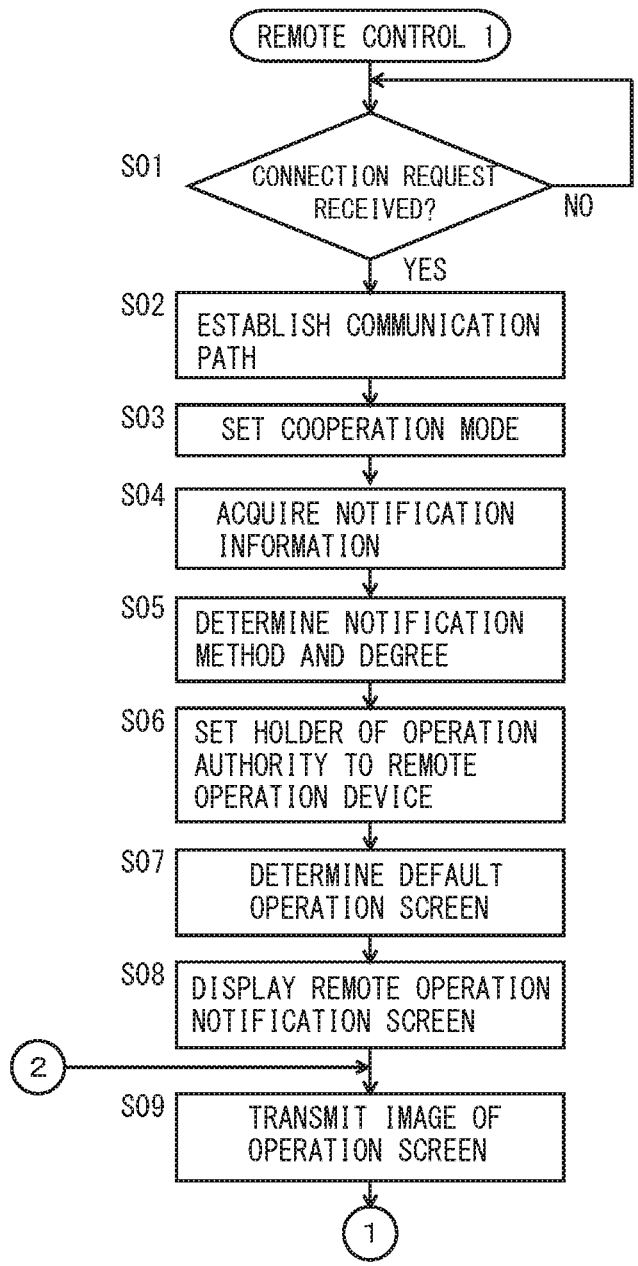
FIG. 9 is a first flow chart showing one example of a flow of a remote control process in the first embodiment.
Figure 10:
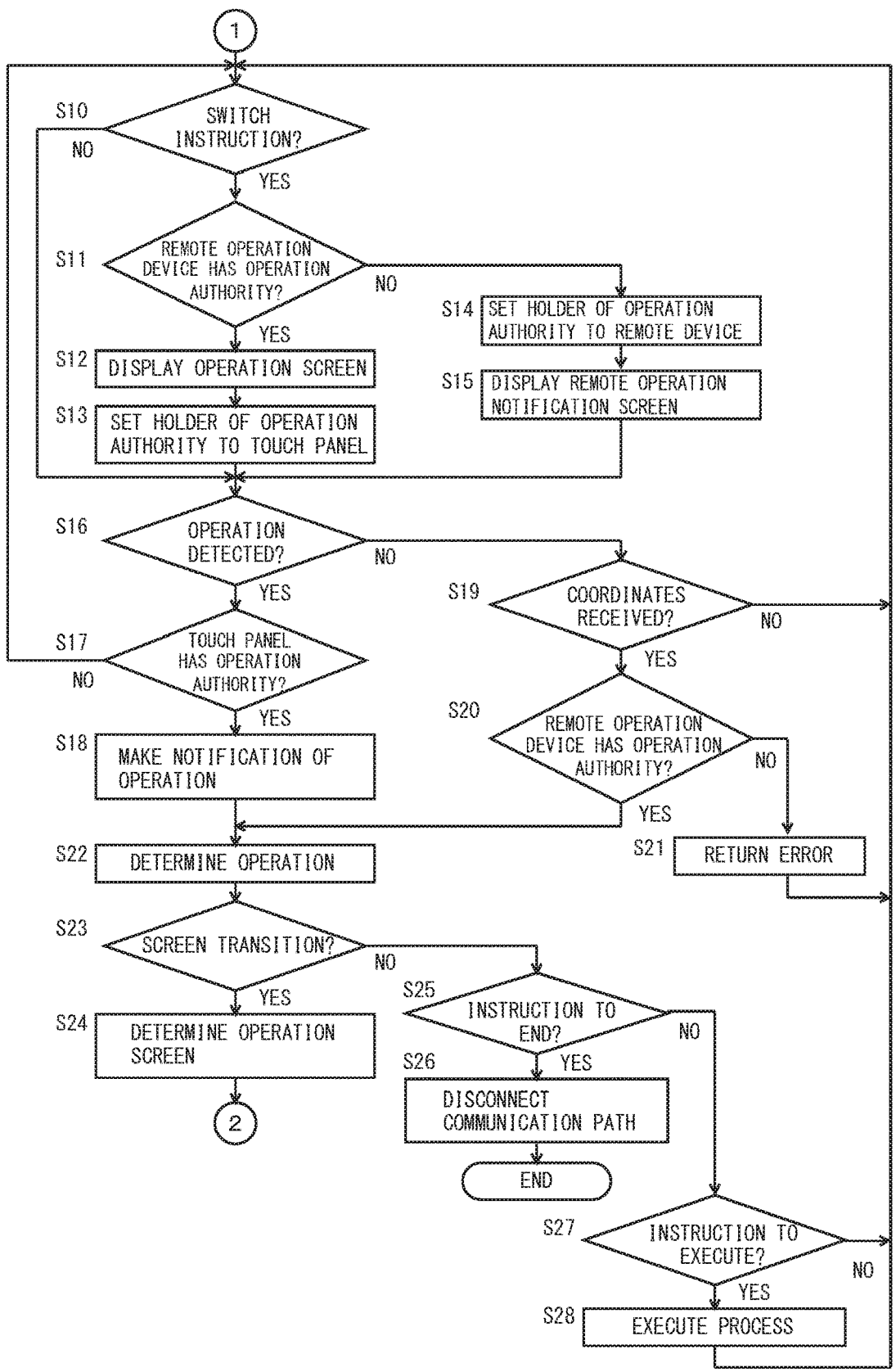
FIG. 10 is a second flow chart showing the one example of the flow of the remote control process in the first embodiment.

FIGS. 9 and 10 are flow charts showing one example of a flow of a remote control process in the first embodiment. The remote control process is a process executed by the CPU 111 in the case where the CPU 111 included in the MFP 100 executes a remote control program stored in the ROM 113, the HDD 115, and the CD-ROM 118. Referring to FIGS. 9 and 10, the CPU 111 determines whether the connection request has been received (step S01). Whether the communication I/F unit 112 has received the connection request from any of the portable information devices 200, 200A, 200B is determined. The process waits until the connection request is received (NO in the step S01). If the connection request is received (YES in the step S01), the process proceeds to the step S02. The case where the connection request is received from the portable information device 200 is described here as an example.

In the step S02, the CPU 111 establishes the communication path with the device that has transmitted the connection request, that is, the portable information device 200 in this case. In the next step S03, the CPU 111 sets the MFP 100 in the cooperation mode, and the process proceeds to the step S04. In the step S04, the CPU 111 acquires the notification information from the portable information device 200 with which the connection path has been established in the step S02. The notification information includes a type of the medium, a range of the degree, and a degree used to notify the user of the acceptance of the operation by the portable information device 200. Then, the notification method and the degree are determined based on the acquired notification information (step S05). If the type of the medium included in the notification information and the type of the medium of the default notification method are the same, the CPU 111 determines to use the default notification method. In the case where the type of the medium included in the notification information, and the type of the medium of the default notification method are different from each other, if it is possible to make notification by using the type of medium same as the type of the medium included in the notification information, the CPU 111 determines to use the notification method using the type of the medium same as the type of the medium included in the notification information. In the case where the type of the medium included in the notification information and the type of the medium of the default notification method are different from each other, if it is not possible to make notification by using the type of the medium included in the notification information, the CPU 111 determines to use the default notification method. Further, a ratio of the degree included in the notification information to the range of the degree included in the notification information is calculated. Then, the CPU 111 determines the degree having the calculated ratio to the range of the degree to which notification can be made by the determined notification method.

In the step S06, the remote operation device is set as the holder of the operation authority, and the process proceeds to the step S07. In the step S07, the default operation screen is determined, and the process proceeds to the step S08. The default operation screen is a predetermined operation screen.

In the step S08, an image of a remote operation notification screen is displayed in the display unit 161, and the process proceeds to the step S09. Thus, the user can know that the holder of the operation authority is the portable information device 200 by viewing the image of the remote operation notification screen displayed in the display unit 161. In the case where knowing that he or she can remotely operate the MFP 100 by operating the portable information device 200 and wishing to operate the MFP 100, the user can know that it is necessary to input an authority switch instruction, described below, in the MFP 100.

In the step S09, an image of an operation screen is transmitted to the portable information device 200 via the communication path established in the step S02, and the process proceeds to the step S10. In the step S10, whether the switch instruction has been accepted is determined. When a predetermined hard key among the plurality of hard keys of the hard key unit 167 included in the operation unit 163 is designated, the switch instruction is accepted. If the switch instruction is accepted, the process proceeds to the step S11. If not, the process proceeds to the step S16.

In the step S11, whether the remote operation device is set as the holder of the operation authority is determined. If the remote operation device is set as the holder of the operation authority, the process proceeds to the step S12. If not, the process proceeds to the step S14. In the step S12, an image of an operation screen that is set as a current operation screen at that time point is displayed in the display unit 161, and the process proceeds to the step S13. In the step S13, the touch panel 165 is set as the holder of the operation authority, and the process proceeds to the step S16. Thus, the user can know that the holder of the operation authority is the MFP 100 by viewing the image of the operation screen displayed in the display unit 161. In other words, the user can know that he or she can operate the MFP 100. In the case where wishing to operate the portable information device 200, the user can know that it is necessary to input the authority switch instruction in the MFP 100.

On the one hand, in the step S14, the remote operation device is set as the holder of the operation authority, and the process proceeds to the step S15. In the step S15, similarly to the step S08, the remote operation notification screen is displayed in the display unit 161, and the process proceeds to the step S16.

In the step S16, whether an operation of giving designation on the touch panel 165 by the user has been detected is determined. In the case where the touch panel 165 outputs a set of coordinates of a position designated by the user, the operation by the user is detected. If the operation by the user is detected, the process proceeds to the step S17. If not, the process proceeds to the step S19. In the step S17, whether the touch panel 165 is set as the holder of the operation authority is determined. If the touch panel 165 is set as the holder of the operation authority, the process proceeds to the step S18. If not, the process returns to the step S10.

In the step S18, notification is made by the notification method determined in the step S05 to the degree determined in the step S05, and the process proceeds to the step S22.

On the one hand, in the step S19, whether the communication I/F unit 112 has received a set of coordinates from the portable information device 200 via the communication path established in the step S02 is determined. If the set of coordinates is received from the portable information device 200, the process proceeds to the step S20. If not, the process returns to the step S10. In the step S20, whether the remote operation device is set as the holder of the operation authority is determined. If the remote operation device is set as the holder of the operation authority, the process proceeds to the step S22. If not, the process proceeds to the step S21. In the step S21, the CPU 111 returns an error to the portable information device 200 via the communication path established in the step S02, and the process returns to the step S10.

In the step S22, the operation by the user is determined. In the case where the process proceeds from the step S18, the operation is determined based on the set of coordinates output by the touch panel 165. In the case where the process proceeds from the step S20, the operation is determined based on the set of coordinates received from the portable information device 200.

In the next step S23, whether the determined operation is an operation of making transition to another screen is determined. If the determined operation is the operation of making transition to another screen, the process proceeds to the step S24. If not, the process proceeds to the step S25. In the step S24, another operation screen is determined, and the process returns to the step S09.

In the step S25, whether the determined operation is an operation of giving an instruction to end a process is determined. If the operation is the operation of giving an instruction to end the process, the process proceeds to the step S26. If not, the process proceeds to the step S27. In the step S26, the CPU 111 disconnects the communication path established with the portable information device 200 in the step S02, and the process ends.

In the step S27, whether the determined operation is an execution instruction operation of giving an instruction to execute a process is determined. If the operation is the execution instruction operation, the process proceeds to the step S28. If not, the process returns to the step S10. In the step S28, a specified type of the process is executed by the execution instruction operation, and the process returns to the step S10.

As described above, in the remote control system of the first embodiment, the MFP 100 functions as the image processing apparatus remotely controlled by the portable information device 200 that functions as the remote operation device. In the cooperation mode where the communication path is established with the portable information device 200, the MFP 100 executes a process in accordance with the remote operation command received from the portable information device. In the case where the portable information device 200 notifies the user by using the first medium in response to the acceptance of the operation by the user, if the cooperation mode is not set, the MFP 100 notifies the user by using the second medium in response to the acceptance of the operation by the user. If the cooperation mode is set, in the case where the second medium is different from the first medium, and it is possible to notify the user by using the first medium, the MFP 100 notifies the user by using the first medium in response to the acceptance of the operation by the user. Therefore, the user is notified of a response to the operation by the same first medium in the case where the user remotely operates the MFP 100 by the portable information device 200 and the case where the user operates the MFP 100. Therefore, the response to the remote operation of the MFP 100 by the portable information device 200 and the response to the operation of the MFP 100 can be the same.

Further, in the case where the portable information device 200 makes notification to a default degree by using the first medium, if the cooperation mode is set, the MFP 100 divides the degree of the notification to be made by the first medium into the same number of levels as the number of a plurality of levels to which the portable information device 200 is capable of making notification by using the first medium, determines a level corresponding to the default level to which the portable information device 200 makes notification by using the first medium among the plurality of divided levels, and notifies the user by using the first medium to the determined level in response to the acceptance of the operation by the user. Therefore, the degree of the notification made by the first medium can be the same in the case where the user remotely operates the MFP 100 by the portable information device and the case where the user operates the MFP 100.

Further, in the case where the cooperation mode is set, if the second medium is different from the first medium, and it is not possible to notify the user by using the first medium, the MFP 100 divides the degree of the notification to be made by the second medium into the same number of levels as the number of a plurality of levels to which the portable information device 200 is capable of making notification by using the first medium, determines a level corresponding to the default level to which the portable information device 200 makes notification by using the first medium among the plurality of divided levels, and notifies the user by using the second medium to the determined level in response to the acceptance of the operation by the user. Therefore, the mediums used to make notification are different from each other in the case where the user remotely operates the MFP 100 by the portable information device 200 and the case where the user operates the MFP 100. However, the notification can be made to the same degree.

Each of the first medium and the second medium is any of sound, an image, and vibration. Therefore, the portable information device 200 and the MFP 100 can respectively notify the user of acceptance of an operation by any of sound, an image and vibration.

Second Embodiment

An overview of a remote control system 1 in the second embodiment is the same as the overview shown in FIG. 1. In the remote control system 1 of the second embodiment, the hardware configurations of the MFP 100 and the portable information device 200 are the same as the hardware configurations respectively shown in FIGS. 2 and 3.

Figure 11:
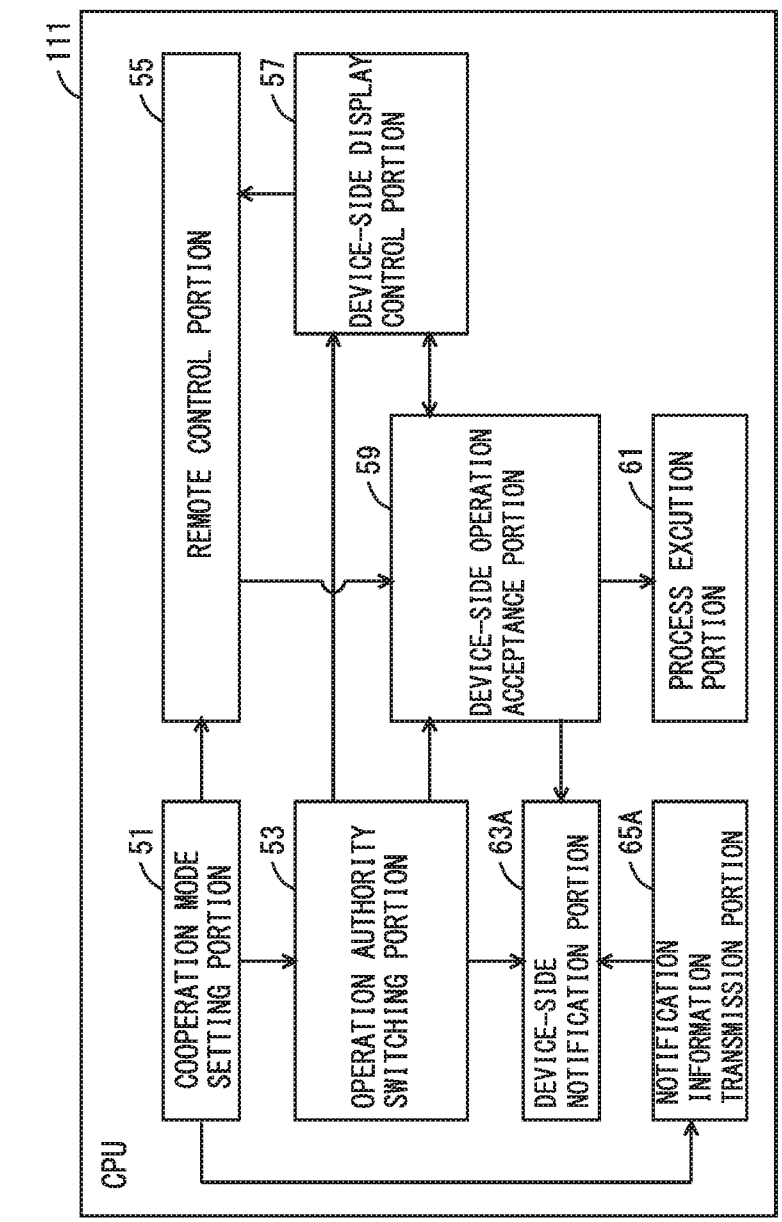
FIG. 11 is a block diagram showing one example of functions of a CPU included in an MFP in a second embodiment.

FIG. 11 is a block diagram showing one example of the functions of the CPU included in the MFP in the second embodiment. Differences of the functions shown in FIG. 11 from the functions shown in FIG. 5 are that the device-side notification portion 63 and the notification information acquisition portion 65 are respectively changed to the device-side notification portion 63A and the notification information transmission portion 65A. The other functions are the same as the functions shown in FIG. 5. Therefore, a description thereof will not be repeated.

Referring to FIG. 10, the device-side notification portion 63A can notify the user of acceptance of an operation by a plurality of notification methods. Specifically, the device-side notification portion 63A can notify the user of the acceptance of the operation by two notification methods, which are a first notification method and a second notification method. The first notification method uses sound as the medium, and the second notification method uses an image as the medium. Further, the device-side notification portion 63A can make notification to a variety of degrees, and makes notification to a predetermined degree within the range of degree to which notification can be made.

In the case where not receiving the switch signal from the operation authority switching portion 53, or in the case where receiving the switch signal indicating that the holder of the operation authority is the touch panel 165 from the operation authority switching portion 53, in response to reception of the notification instruction from the device-side operation acceptance portion 59, the device-side notification portion 63A notifies the user of the acceptance of the operation by a default notification method to a default degree. In the case where the first notification method is determined as the default notification method, the device-side notification portion 63A outputs sound in default volume from the speaker 119. In the case where the second notification method is defined as the default notification method, the device-side notification portion 63A displays a default image in a default size on an image of an operation screen displayed in the display unit 161 in a superimposed manner.

In the case where receiving the path identification information from the cooperation mode setting portion 51, the notification information transmission portion 65A controls the communication I/F unit 112, communicates with the portable information device 200 that is the remote operation device via the communication path specified by the path identification information, and transmits the notification information to the portable information device 200. The notification information includes a type of a default medium used to make notification by the device-side notification portion 63A, a range of a degree, and a default degree. In the case where the first notification method is defined as the default notification method, the notification information transmission portion 65A transmits the notification information in which the type of the medium is specified as "sound", the range of the degree is specified as the range of the volume in which the speaker 119 is capable of outputting sound, and the degree is specified as the default volume for output of the sound from the speaker 119. In the case where the second notification method is defined as the default notification method, the notification information transmission portion 65A transmits the notification information in which the type of the medium is specified as an "image", the range of the degree is specified as the range of the size in which the MFP 100 is capable of displaying a default image, and the degree is specified as the default size for the display of the image.

Figure 12:
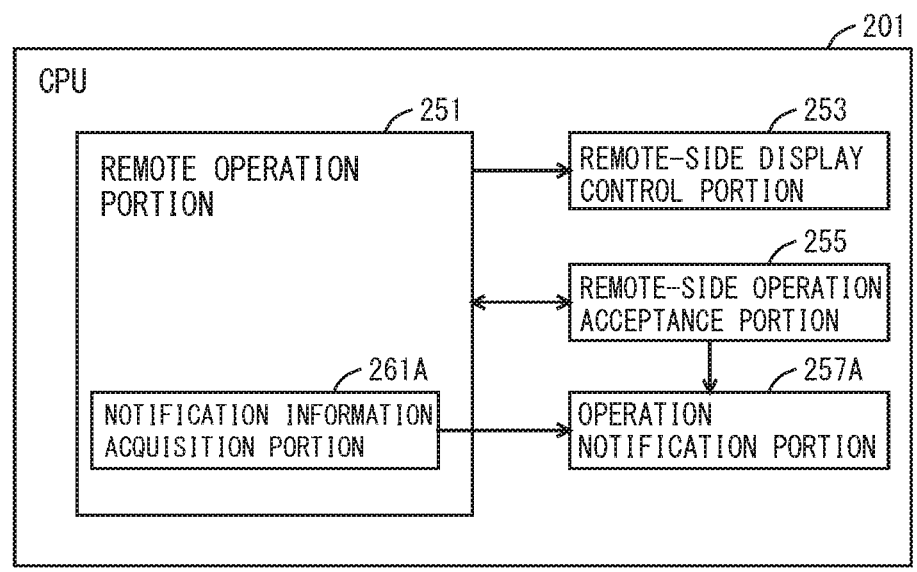
FIG. 12 is a block diagram showing one example of an outline of functions of a CPU included in a portable information device in the second embodiment.

FIG. 12 is a block diagram showing one example of an outline of the functions of the CPU included in the portable information device in the second embodiment. Referring to FIG. 12, differences from the functions shown in FIG. 4 are that the remote operation portion 251 does not include the notification information transmission portion 261, but includes the notification information acquisition portion 261A, and that the operation notification portion 257 is changed to the operation notification portion 257A. The other functions are the same as the functions shown in FIG. 4. Therefore, a description thereof will not be repeated.

When the communication path is established with the MFP 100 that is the remote control device, the notification information acquisition portion 261A controls the wireless LAN I/F 208, communicates with the MFP 100, and acquires the notification information from the MFP 100. The notification information acquisition portion 261A outputs the acquired notification information to the operation notification portion 257A.

In response to reception of the notification instruction from the remote-side operation acceptance portion 255, the operation notification portion 257A notifies the user of the acceptance of the operation. The operation notification portion 257A can notify the user of the acceptance of the operation by a plurality of notification methods. The operation notification portion 257A can notify the use of the acceptance of the operation by any of the notification method using vibration as the medium, the notification method using sound as the medium, and the notification method using an image as the medium. Further, the operation notification portion 257A can make notification to a variety of degrees. The operation notification portion 257A defines any of the notification method using vibration as the medium, the notification method using sound as the medium, and the notification method using an image as the medium as the default notification method. Further, the operation notification portion 257A defines the default degree of the notification within the predetermined range of the degree for the medium.

The operation notification portion 257A determines the notification method and the degree based on the notification information received from the notification information acquisition portion 261A. The notification information includes the type of the medium, the range of the degree, and the degree. The operation notification portion 257A compares the type of the medium included in the notification information with the type of the medium of the default notification method. If they are the same, the operation notification portion 257A determines to use the default notification method. In the case where determining to use the default notification method, the operation notification portion 257A determines the degree to which notification is made by the determined notification method based on the range of the degree and the degree included in the notification information. A ratio of the degree included in the notification information to the range of the degree included in the notification information is calculated, and the degree having the same ratio as the calculated ratio to the range of the degree to which notification can made by the determined notification method is determined.

In the case where the type of the medium included in the notification information and the type of the medium of the default notification method are different from each other, if it is possible to make notification by the notification method using the type of the medium included in the notification information, the operation notification portion 257A determines to use the notification method using the type of the medium included in the notification information. In the case where determining to use the notification method using the type of the medium included in the notification information, the operation notification portion 257A determines the degree to which notification is made by the determined notification method based on the range of the degree and the degree included in the notification information.

In the case where the type of the medium included in the notification information and the type of the medium of the default notification method are different from each other, if it is not possible to make notification by the notification method using the type of the medium included in the notification information, the operation notification portion 257A determines to use any notification method by which notification can be made. Further, the operation notification portion 257A determines the degree to which notification is made by the determined notification method based on the range of the degree and the degree included in the notification information. A ratio of the degree included in the notification information to the range of the degree included in the notification information is calculated, and the degree having the same ratio as the calculated ratio to the range of the degree to which notification can be made by the determined notification method is determined. In response to reception of the notification instruction from the remote-side operation acceptance portion 255, the operation notification portion 257A makes notification to the determined degree by using the medium defined by the determined notification method.

As for the operation of the operation notification portion 257A, the notification information acquired from the MFP 100 that is the remote control device will be described below according to the cases.

<The case where the first notification method is the default notification method in the MFP>

In this case, in response to detection by the touch panel 165 of a position designated by the user, the MFP 100 allows the speaker 119 to output sound in predetermined volume. Therefore, in the notification information acquired by the notification information acquisition portion 261A, the type of the medium is "sound", the range of the degree is the range of the volume of the sound, and the degree is the volume of the sound.

(1) The case where the default notification method is not defined in the operation notification portion 257A.

The operation notification portion 257A can make notification by the notification method using "sound" that is the type of the medium included in the notification information as the medium. Therefore, the operation notification portion 257A determines to use the notification method using sound as the medium.

(2) The case where the notification method using sound as the medium is defined as the default notification method in the operation notification portion 257A. The type of the medium included in the notification information and the type of the medium of the default notification method using sound as the medium are the same. Therefore, the device-side notification portion 63 determines to use the notification method using sound as the medium.

(3) The case where the notification method using vibration or an image as the medium is defined as the default notification method in the operation notification portion 257A.

The type of the medium included in the notification information and the type of the medium of the default notification method using vibration as the medium are different from each other. Further, the operation notification portion 257A can make notification by the notification method using "sound" that is the type of the medium included in the notification information as the medium. Therefore, the device-side notification portion 63 determines to use the notification method using sound as the medium.

In the case where determining to use the notification method using sound as the medium, the operation notification portion 257A calculates a ratio of the degree in the notification information to the range of the degree included in the notification information. For example, a ratio of the volume of the sound included in the notification information to the range of the volume of the sound included in the notification information is specified as 60%. The operation notification portion 257A performs a setting operation such that sound is generated in the volume of 60% of the range of the volume in which the speaker included in the call unit 205 is capable of generating sound.

In response to reception of the notification instruction from the remote-side operation acceptance portion 255, the operation notification portion 257A controls the speaker included in the call unit 25 to output the sound to the determined degree. When the holder of the operation authority is switched to the MFP 100, and the designation is made on the touch panel 165, the user is aurally notified of the acceptance of the operation by sound in the predetermined volume. In contrast, when the user gives designation on the touch panel 207B of the portable information device 200, the user is notified of the acceptance of the operation by generation of sound in the predetermined volume by the portable information device 200. Further, because the volume of the sound by which notification is made to the user has the same ratio to the range of the volume in which the portable information device 200 is capable of generating sound as the ratio of the volume in which the MFP 100 generates the sound to the range of the volume in which the MFP 100 is capable of generating sound, notification can be made to the same degree as the degree of notification in the MFP 100. Therefore, even in the case where the user operates any of the portable information device 200 and the MFP 100, the degree of the volume of the sound generated in response to the acceptance of the operation can be the same.

<The case where the second notification method is the default notification method in the MFP>

In this case, in response to detection by the touch panel 165 of a position designated by the user, the MFP 100 displays a default image in a default size on an image of an operation screen displayed in the display unit 161 in a superimposed manner. Therefore, in the notification information acquired by the notification information acquisition portion 261A from the MFP 100, the type of the medium is an "image", the range of the degree is the range of the size of the image, and the degree is the size of the image.

(1) The case where the default notification method is not defined in the operation notification portion 257A.

The operation notification portion 257A can make notification by the notification method using an "image" that is the type of the medium included in the notification method as the medium. Thus, the operation notification portion 257A determines to use the notification method using an image as the medium.

(2) The case where the notification method using an image as the medium is defined as the default notification method in the operation notification portion 257A.

The type of the medium included in the notification information and the type of the medium of the default notification method using an image as the medium are the same. Therefore, the device-side notification portion 63 determines to use the notification method using an image as the medium.

(3) The case where the notification method using sound or vibration as the medium is defined as the default notification method in the operation notification portion 257A.

The type of the medium included in the notification information and the type of the medium of the default notification method using vibration as the medium are different from each other. Further, the operation notification portion 257A can make notification by the notification method using an "image" that is the type of the medium included in the notification information as the medium. Therefore, the device-side notification portion 63 determines to use the notification method using an image as the medium.

In the case where determining to use the notification method using an image as the medium, the operation notification portion 257A calculates a ratio of the degree included in the notification information to the range of the degree included in the notification information. For example, a ratio of the size of the image included in the notification information to the range of the size of the image included in the notification information is specified as 60%. The operation notification portion 257A sets the size of the predetermined image to 60% of the range of the size in which the display unit 206 is capable of displaying an image.

In the case where receiving the notification instruction from the remote-side operation acceptance portion 255, in response to detection by the touch panel 207B of a position designated by the user, the operation notification portion 257A displays a default image in a set size on an image of an operation screen displayed in the display unit 206 in a superimposed manner.

When the holder of the operation authority is switched to the MFP 100, and designation is made on the touch panel 165, the user is visually notified of the acceptance of the operation by display of a predetermined image in a predetermined size. In contrast, when the user gives designation on the touch panel 207B of the portable information device 200, the user is notified of the acceptance of the operation by display of a predetermined image in a set size in the display unit 206 of the portable information device 200. Further, because the size of the predetermined image displayed in the display unit 206 has the same ratio to the range of the size in which the portable information device 200 is capable of displaying an image as the ratio of the size in which the MFP 100 displays the predetermined image to the range of the size in which the MFP 100 is capable of displaying an image, the predetermined image can be displayed to the same degree as the degree of notification in the MFP 100. Therefore, even in the case where the user operates any of the portable information device 200 and the MFP 100, the degree of the sizes of the images displayed in response to the acceptance of the operation can be the same.

Figure 13:
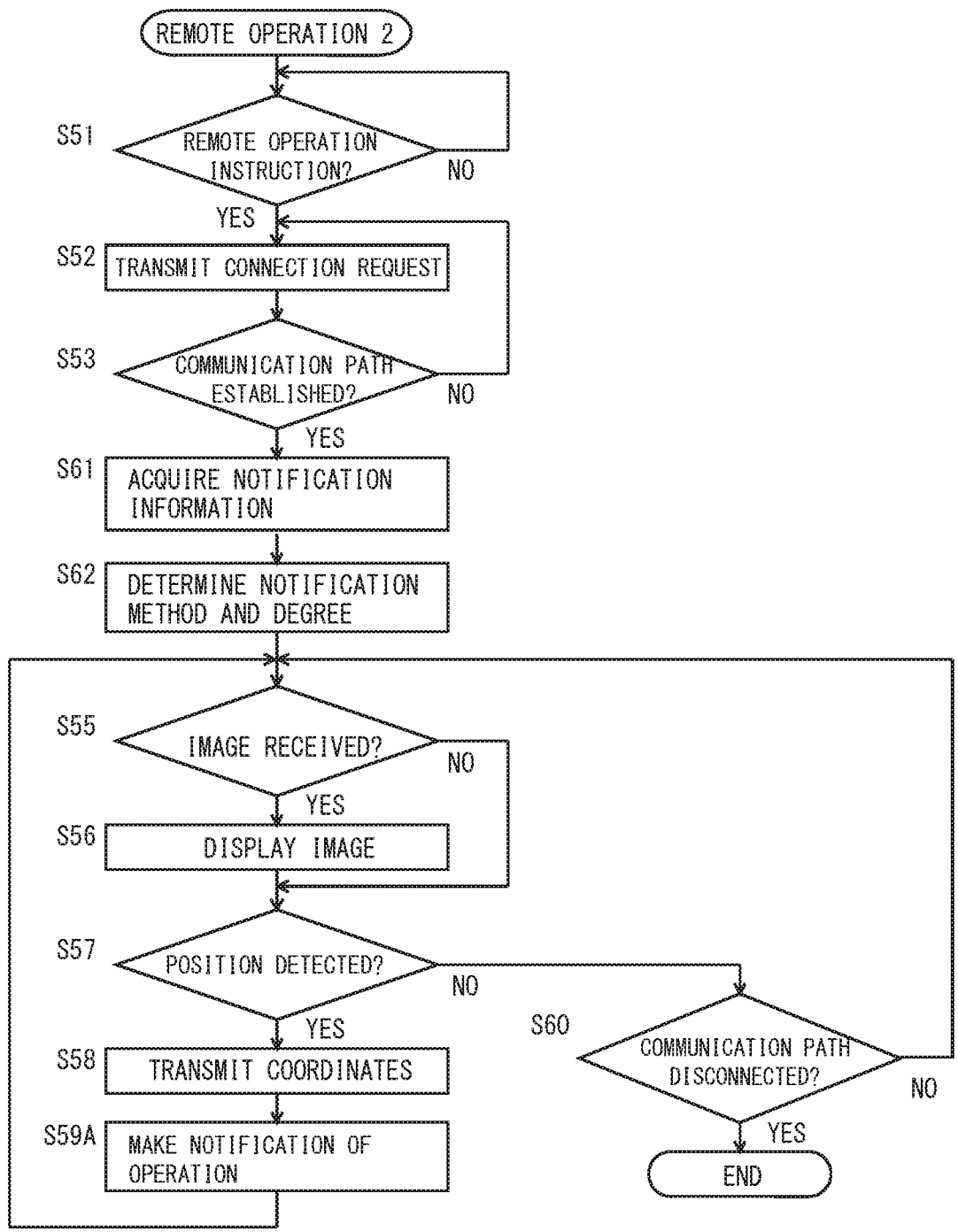
FIG. 13 is a flow chart showing one example of a flow of a remote operation process in the second embodiment.

FIG. 13 is a flow chart showing one example of a flow of a remote operation process in the second embodiment. Referring to FIG. 13, differences from the remote operation process shown in FIG. 8 are that the step S61 and the step S62 are added instead of the step S54, and the step S59 is changed to the step S59A. Other steps are the same as the steps shown in FIG. 8. Therefore, a description thereof will not be repeated.

In the step S61, the notification information is acquired from the MFP 100 with which the communication path has been established in the step S53. The notification information includes a type of the default medium used to make notification of the acceptance of the operation by the MFP 100, a range of the degree, and a default degree. Then, the notification method and the degree are determined based on the acquired notification information (step S62), and the process proceeds to the step S55. If the type of the medium included in the notification information and the type of the medium of the default notification method are the same, the CPU 201 determines to use the default notification method. In the case where the type of the medium included in the notification information and the type of the medium of the default notification method are different from each other, if it is possible to make notification by using the type of the medium same as the type of the medium included in the notification information, the CPU 201 determines to use the notification method by using the type of the medium same as the type of the medium included in the notification information. In the case where the type of the medium included in the notification information and the type of the medium of the default notification method are different from each other, if it is not possible to make notification by using the type of the medium same as the type of the medium included in the notification information, the CPU 201 determines to use the default notification method. Further, a ratio of the degree included in the notification information to the range of the degree included in the notification information is calculated. Then, the degree having the same ratio as the calculated ratio to the range of the degree to which notification can be made by the determined notification method is determined.

In the step S59A, notification is made by the notification method determined in the step S62 to the degree determined in the step S62, and the process returns to the step S55.

Figure 14:
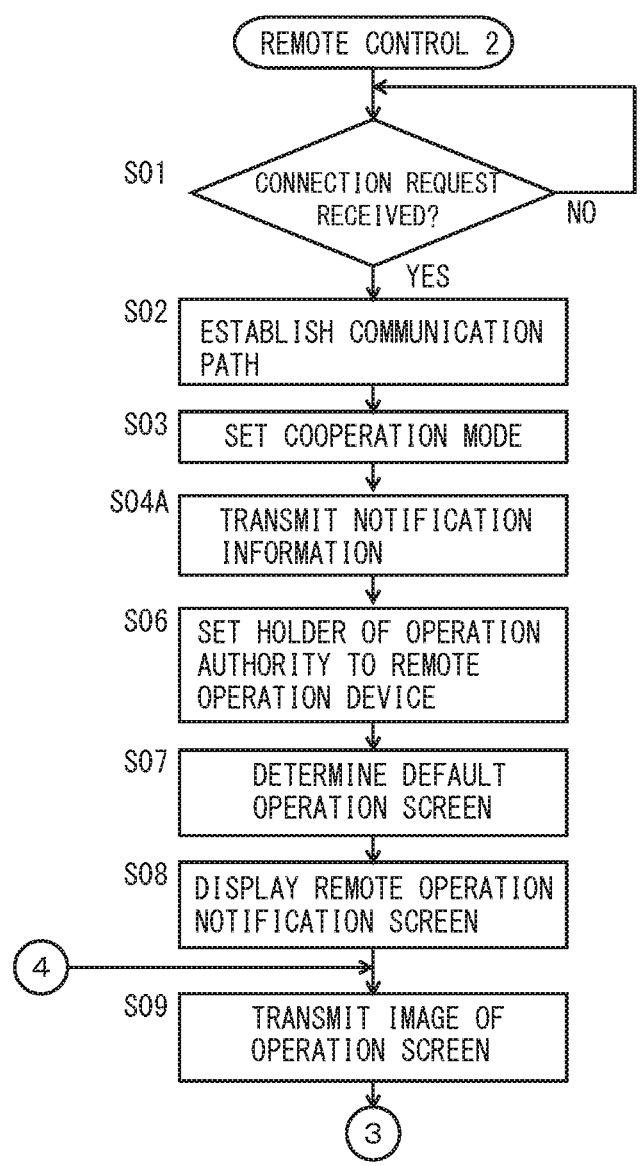
FIG. 14 is a first flow chart showing one example of a flow of a remote control process in the second embodiment.
Figure 15:
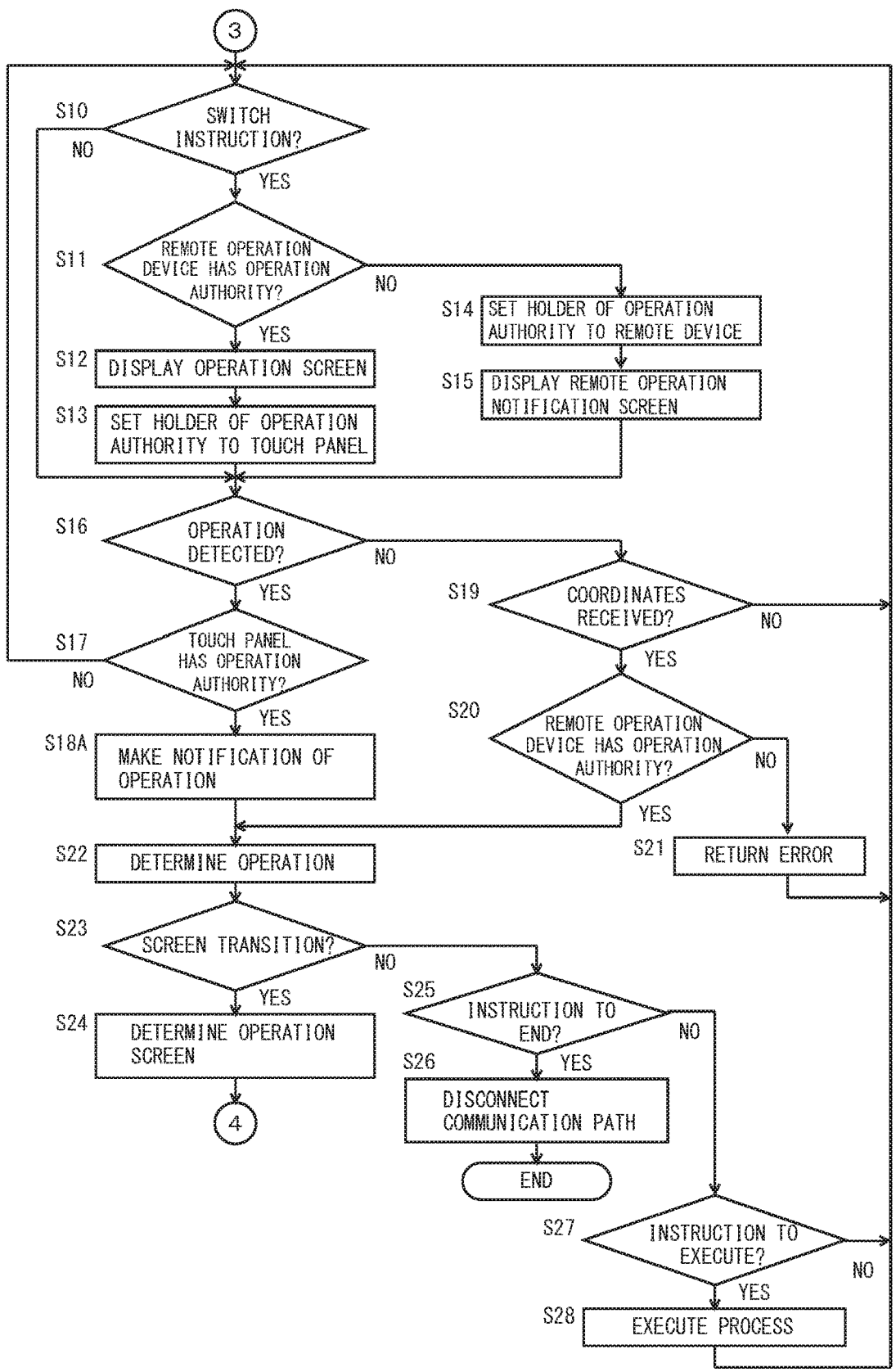
FIG. 15 is a second flow chart showing the one example of the flow of the remote control process in the second embodiment.

FIGS. 14 and 15 are flow charts showing one example of a flow of the remote control process in the second embodiment. Referring to FIGS. 14 and 15, differences from the remote control process shown in FIGS. 8 and 10 are that the step S05 is deleted, and that the step S04 and the step S18 are respectively changed to the step S04A and the step S18A. Other steps are the same as the steps shown in FIG. 9. Therefore, a description thereof will not be repeated.

In the step S04A, the CPU 111 transmits the notification information to the portable information device 200 with which the communication path has been established in the step S02, and the process proceeds to the step S06.

In the step S18A, the user is notified of the acceptance of the operation by a default notification method to a default degree, and the process proceeds to the step S22. In the case where the first notification method is set as the default notification method, the CPU 111 allows the speaker 119 to output sound in predetermined volume. In the case where the second notification method is set as the default notification method, the CPU 111 displays a predetermined image in a predetermined size on an image of an operation screen displayed in the display unit 161 in a superimposed manner.

As described above, in the remote control system of the second embodiment, the MFP 100 functions as the image processing apparatus remotely controlled by the portable information device 200 that functions as the remote operation device. In the cooperation mode where the communication path has been established with the portable information device 200, the MFP 100 executes a process in accordance with the remote operation command received from the portable information device. In the case where the MFP 100 notifies the user by using the first medium when the operation by the user is accepted, if the cooperation mode is not set, the MFP 100 notifies the user by using the second medium when the operation by the user is accepted. If the cooperation mode is set, in the case where the second medium is different from the first medium, and it is possible to notify the user by using the first medium, the MFP 100 notifies the user by using the first medium in response to the acceptance of the operation by the user. Therefore, the user is notified of a response to the operation by the same first medium in the case where the user remotely operates the MFP 100 by the portable information device 200 and the case where the user operates the MFP 100. Therefore, the response to the remote operation of the MFP 100 by the portable information device 200 and the response to the operation of the MFP 100 can be the same.

Further, in the case where the MFP 100 makes notification to a default degree by using the first medium, if the cooperation mode is set, the portable information device 200 divides the degree of the notification to be made by the first medium into the same number of levels as the number of a plurality of levels to which the MFP 100 is capable of making by using the first medium, determines a level corresponding to the default level to which the MFP 100 makes notification by using the first medium among the plurality of divided levels, and notifies the user by using the first medium to the determined level in response to the acceptance of the operation by the user. Therefore, the degree of the notification made by the first medium can be the same in the case where the user remotely operates the MFP 100 by the portable information device and the case where the user operates the MFP 100.

Further, in the case where the cooperation mode is set, if the second medium is different from the first medium, and it is not possible to notify the user by using the first medium, the MFP 100 divides the degree of the notification to be made by the second medium into the same number of levels as the number of a plurality of levels to which the MFP 100 is capable of making notification by using the first medium, determines a level corresponding to the default level to which the MFP 100 makes notification by using the first medium among the plurality of divided levels, and notifies the user by using the second medium to the determined level in response to the acceptance of the operation by the user. Therefore, the mediums used to make notification are different from each other in the case where the user remotely operates the MFP 100 by the portable information device 200 and the case where the user operates the MFP 100. However, the notification can be made to the same degree.

Each of the first medium and the second medium is any of sound, an image, and vibration. Therefore, the portable information device 200 and the MFP 100 can respectively notify the user of acceptance of an operation by any of sound, an image and vibration.

While the remote control system 1 has been described in the above-mentioned embodiment, the present invention may of course be identified as the remote control method for allowing the MFP 100 to execute the remote control process shown in FIGS. 10 and 11 or FIGS. 14 and 15, and the remote control program that allows the CPU 111 controlling the MFP 100 to perform the remote control method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A remote control system comprising an image processing apparatus and a remote operation device capable of remotely operating the image processing apparatus, wherein
    the remote operation device includes
        a display that displays an image,
        a remote-side acceptor that accepts an operation by a user,
        a sensor that detects a position of the display designated by the user,
        a first hardware processor, and
        a first memory comprising instructions to cause the first hardware processor to:
            when the operation is accepted by the remote-side acceptor, transmit a remote operation command to the image processing apparatus; and
            when a position is detected by the sensor, detect an operation of designating a position in the image, display an image received from the image processing apparatus in the display, and transmit a remote operation command including position information indicating the position in the image specified by the detected operation to the image processing apparatus,
    the image processing apparatus includes
        a device-side display that displays an image;
        a device-side acceptor that accepts an operation by the user by detecting a position designated by the user in a display surface of the device-side display,
        a second hardware processor, and
        a second memory comprising instructions to cause the second hardware processor of the image processing apparatus to:
            execute a process corresponding to the operation accepted by the device-side acceptor, and
            in a cooperation mode where a communication path is established between the remote operation device, execute a process in accordance with the remote operation command received from the remote operation device; and
            when a position is detected by the device-side acceptor with an image of an operation screen being displayed in the device-side display, determine an operation associated with a position in the operation screen corresponding to the detected position, transmit an image of an operation screen to the remote operation device, and then execute a process corresponding to an operation associated with a position, corresponding to the position specified by the position information included in the remote operation command received from the remote operation device, in the image of the transmitted operation screen,
    wherein a first device that is any one of the remote operation device and the image processing apparatus further comprises instructions stored on memory that, when executed by a hardware processor of the first device, cause the first device to at least:
        notify the user by using a first medium when an operation by the user is accepted, and
    wherein a second device that is any one of the remote operation device and the image processing apparatus, and different from the first device, further comprises instructions stored on memory that, when executed by a hardware processor of the second device cause the second device to:
        notify the user by using a second medium different from the first medium when an operation by the user is accepted and the cooperation mode is not set, and
        notify the user by using the first medium when an operation by the user is accepted and the cooperation mode is set.

2. The remote control system according to claim 1, wherein
    the hardware processor included in the first device, in the case where notifying the user by using the first medium, makes notification to a level selected from among a plurality of levels having different degrees of notification, and
    the hardware processor included in the second device, in the case where the cooperation mode is set, divides a degree of notification by the first medium into the same number of levels as the number of a plurality of levels that can be selected by the first device, determines a level corresponding to a level to which the first device makes notification from among the plurality of divided levels, and notifies the user by using the first medium to the deteimined level when an operation by the user is accepted.

3. The remote control system according to claim 2, wherein
    the hardware processor included in the second device, in the case where the cooperation mode is set, if the second medium is different from the first medium, and it is not possible to notify the user by using the first medium, divides a degree of notification by the second medium into the same number of levels as the number of the plurality of levels that can be selected by the first device, determines a level corresponding to a level to which the first device makes notification from among the plurality of divided levels, and notifies the user by using the second medium to the determined level when an operation by the user is accepted.

4. The remote control system according to claim 1, wherein the first medium and the second medium are any of sound, an image and vibration.

5. The remote control system according to claim 1, wherein
the hardware processor included in the remote operation device executes at least one of
a process of outputting sound from a speaker,
a process of displaying a predetermined image on an image displayed in the display in a superimposed manner, and
a process of vibrating a vibrator, and
the hardware processor included in the image processing apparatus executes at least one of
a process of outputting sound from a device-side speaker,
a process of displaying a predetermined image on an image displayed in a device-side display in a superimposed manner, and
a process of vibrating a device-side vibrator.

6. The remote control system according to claim 1, wherein
the sensor that detects a position designated by the user in a display surface of the display is a touch sensor, and
the device-side acceptor includes a device-side touch panel a to detect the position designated by the user in the display surface of the device-side display.

7. The remote control system according to claim 1, wherein
the hardware processor included in the image processing apparatus,
in the cooperation mode, switches a holder of operation authority to any of the remote operation device and the image processing apparatus, and
in the case where the holder of the operation authority is switched to the image processing apparatus in the cooperation mode, executes a process corresponding to an operation accepted by the device-side operation acceptor.

8. An image processing apparatus capable of being remotely operated by a remote operation device comprising:
an operation acceptor that accepts an operation by a user, wherein a sensor on a display of the remote operation device detects a position designated by the user, the position designating a position in an image received from the image processing apparatus and being indicative of the operation command, and the remote operation device transmits the position indicative of the operation command to the image processing apparatus;
a device-side display that displays an image;
a hardware processor, and
a memory comprising instructions to cause the hardware processor to at least: execute a process corresponding to the operation accepted by the operation acceptor,
when a cooperation mode where a communication path is established with the remote operation device, execute a process in accordance with a remote operation command received from the remote operation device,
acquire a type of a first medium used to notify the user when an operation is accepted by the remote operation device,
in the case where the cooperation mode is not set, notify the user by using a second medium when an operation is accepted by the operation acceptor,
in the case where the cooperation mode is set, if the second medium is different from the first medium, and it is possible to notify the user by using the first medium, notify the user by using the first medium when an operation is accepted by the operation acceptor, and
when a position is detected by the operation acceptor with an image of an operation screen being displayed in the device-side display, determine an operation associated with a position in the operation screen corresponding to the detected position, transmit an image of an operation screen to the remote operation device, and then execute a process corresponding to an operation associated with a position corresponding to the position specified by the position information included in the remote operation command received from the remote operation device, in the image of the transmitted operation screen.

9. The image processing apparatus according to claim 8, wherein
the hardware processor
acquires a range of a degree to which the remote operation device is capable of making notification by using the first medium, and a level within the range of the degree set for notification by the first medium made by the remote operation device, and
in the case where the cooperation mode is set, divides a degree of notification by the first medium into the same number of levels as the number of a plurality of levels that can be selected by the remote operation device, determines a level corresponding to a level to which the remote operation device makes notification from among the plurality of divided levels, and notifies the user by using the first medium to the determined level when an operation by the user is accepted by the operation acceptor.

10. The image processing apparatus according to claim 9, wherein
the hardware processor, in the case where the cooperation mode is set, if the second medium is different from the first medium, and it is not possible to notify the user by using the first medium, divides a degree of notification by the second medium into the same number of levels as the number of a plurality of levels that can be selected by the remote operation device, determines a level corresponding to a level to which the remote operation device makes notification from among the plurality of divided levels, and notifies the user by using the second medium to the determined level when an operation by the user is accepted.

11. A remote control method performed by an image processing apparatus capable of being remotely operated by a remote operation device, including:
a detection step of detecting an operation command from a user, wherein a sensor on a display of the remote operation device detects a position designated by the user, the position designating a position in an image received from the image processing apparatus and being indicative of the operation command, and the remote operation device transmits the position indicative of the operation command to the image processing apparatus;
a display step of displaying an image on a device-side display of the image processing apparatus;
an acceptance step of accepting the operation command by the user;
a process execution step of executing a process corresponding to the operation accepted in the acceptance step;

a setting step of setting the image processing apparatus in a cooperation mode where a communication path is established with the remote operation device;

a remote control step of, in the cooperation mode, executing a process in accordance with a remote operation command received from the remote operation device;

a type acquisition step of acquiring a type of a first medium used to notify the user when an operation is accepted by the remote operation device;

a first notification step of, in the case where the cooperation mode is not set, notifying the user by using a second medium when the operation is accepted in the acceptance step; and a second notification step of, in the case where the cooperation mode is set, if the second medium is different from the first medium, and it is possible to notify the user by using the first medium, notifying the user by using the first medium when the operation is accepted in the acceptance step; and when a position is detected in the detection step, with an image of an operation screen being displayed in the device-side display, determining an operation associated with a position in the operation screen corresponding to the detected position, transmitting an image of an operation screen to the remote operation device, and then executing a process corresponding to an operation associated with a position corresponding to the position specified by the position information included in the remote operation command received from the remote operation device, in the image of the transmitted operation screen.

12. The remote control method according to claim 11, further including a level acquisition step of acquiring a range of a degree to which the remote operation device is capable of making notification by using the first medium and a level within the range of the degree set for notification by the first medium made by the remote operation device, wherein the second notification step, in the case where the cooperation mode is set, includes a step of dividing a degree of notification by the first medium into the same number of levels as the number of a plurality of levels that can be selected by the remote operation device, determining a level corresponding to a level to which the remote operation device makes notification from among the plurality of divided levels, and notifying the user by using the first medium to the determined level when the operation by the user is accepted in the acceptance step.

13. The remote control method according to claim 12, further including a third notification step of, in the case where the cooperation mode is set, if the second medium is different from the first medium, and it is not possible to notify the user by using the first medium, dividing a degree of notification by the second medium into the same number of levels as the number of a plurality of levels that can be selected by the remote operation device, determining a level corresponding to a level to which the remote operation device makes notification from among the plurality of divided levels, and notifying the user by using the second medium to the determined level when the operation by the user is accepted in the acceptance step.

14. A non-transitory computer-readable recording medium encoded with a remote control program executed by a computer which controls an image processing apparatus capable of being remotely operated by a remote operation device, wherein the remote control program causes the computer to execute:

a detection step of detecting an operation command from a user, wherein a sensor on a display of the remote operation device detects a position designated by the user, the position designating a position in an image received from the image processing apparatus and being indicative of the operation command, and the remote operation device transmits the position indicative of the operation command to the image processing apparatus;

a display step of displaying an image on a device-side display of the image processing apparatus;

an acceptance step of accepting an operation by a user;

a process execution step of executing a process corresponding to the operation accepted in the acceptance step;

a setting step of setting an image processing apparatus in a cooperation mode where a communication path is established with the remote operation device;

a remote control step of, in the cooperation mode, executing a process in accordance with a remote operation command received from the remote operation device;

a type acquisition step of acquiring a type of a first medium used to notify the user when an operation is accepted by the remote operation device;

a first notification step of, in the case where the cooperation mode is not set, notifying the user by using a second medium when the operation is accepted in the acceptance step;

a second notification step of, in the case where the cooperation mode is set, if the second medium is different from the first medium, and it is possible to notify the user by using the first medium, notifying the user by using the first medium when the operation is accepted in the acceptance step; and when a position is detected in the detection step, with an image of an operation screen being displayed in the device-side display, determining an operation associated with a position in the operation screen corresponding to the detected position, transmitting an image of an operation screen to the remote operation device, and then executing a process corresponding to an operation associated with a position corresponding to the position specified by the position information included in the remote operation command received from the remote operation device, in the image of the transmitted operation screen.

15. The non-transitory computer-readable recording medium according to claim 14, wherein the remote control program causes the computer to further execute a level acquisition step of acquiring a range of a degree to which the remote operation device is capable of making notification by using the first medium, and a level within the range of the degree set for notification by the first medium made by the remote operation device, wherein the second notification step includes a step of, in the case where the cooperation mode is set, dividing a degree of notification by the first medium into the same number of levels as the number of a plurality of levels that can be selected by the remote operation device, determining a level corresponding to a level to which the remote operation device makes notification from among the plurality of divided levels, and notifying the user by using the first medium to the determined level when the operation by the user is accepted in the acceptance step.

16. The non-transitory computer-readable recording medium according to claim 15, wherein the remote control program causes the computer to further execute a third notification step of, in the case where the cooperation mode is set, if the second medium is different from the first medium, and it is not possible to notify the user by using the first medium, dividing a degree of notification by the second medium into the same number of levels as the number of a plurality of levels that can be selected by the remote operation device, determining a level corresponding to a level to which the remote operation device makes notification from among the plurality of divided levels, and notifying the user by using the second medium to the determined level when the operation by the user is accepted in the acceptance step.

\* \* \* \* \*